(12) United States Patent
Ozbek et al.

(10) Patent No.: US 10,539,695 B2
(45) Date of Patent: Jan. 21, 2020

(54) WAVEFIELD RECONSTRUCTION

(71) Applicant: WESTERNGECO LLC, Houston, TX (US)

(72) Inventors: Ali Ozbek, Cambridge (GB); Massimiliano Vassallo, Gatwick (GB); David Fraser Halliday, Cambridge (GB); Jon-Fredrik Hopperstad, Cambridge (GB); Robert Montgomery Laws, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 353 days.

(21) Appl. No.: 15/307,742

(22) PCT Filed: Apr. 28, 2015

(86) PCT No.: PCT/US2015/028002
§ 371 (c)(1),
(2) Date: Oct. 28, 2016

(87) PCT Pub. No.: WO2015/168130
PCT Pub. Date: Nov. 5, 2015

(65) Prior Publication Data
US 2017/0115415 A1    Apr. 27, 2017

Related U.S. Application Data

(60) Provisional application No. 61/985,293, filed on Apr. 28, 2014.

(51) Int. Cl.
*G01V 1/32* (2006.01)
*G01V 1/28* (2006.01)

(52) U.S. Cl.
CPC ............. *G01V 1/325* (2013.01); *G01V 1/282* (2013.01); *G01V 2210/42* (2013.01)

(58) Field of Classification Search
CPC ..................................................... G01V 1/325
See application file for complete search history.

(56) References Cited

U.S. PATENT DOCUMENTS 5,724,241 A * 3/1998 Wood ................... G01V 1/20
702/14
6,182,014 B1 * 1/2001 Kenyon ................ G01V 1/003
702/14

(Continued)

FOREIGN PATENT DOCUMENTS

CN     1227634 A    9/1999
CN     1664617 A    9/2005
(Continued)

OTHER PUBLICATIONS

Abma, R. et al., "Popcorn shooting: Sparse inversion and the distribution of airgun array energy over time", 83rd Annual International Meeting, SEG, Expanded Abstracts, 201, pp. 31-35.

(Continued)

*Primary Examiner* — Manuel L Barbee
*Assistant Examiner* — Raymond L Nimox

(57) ABSTRACT

A technique for reconstructing a seismic wavefield includes receiving data over one or more channels of a plurality of channels from a plurality of stations. The data is recorded by a plurality of seismic receivers and represent measurements of properties of the seismic wavefield. Each station includes a region in space including one or more seismic receivers. Each channel either measures a property of the seismic wavefield or a property of the seismic wavefield after the seismic wavefield has undergone a known transformation. At least one channel is derived as a function of one or more other channels. The technique includes using a processor based machine to process the data to model the seismic wavefield as a sum of basis functions; apply to the basis functions at least one forward transformation that describes (Continued)

the measurements received over the channel(s); and determine optimum basis functions based at least in part on the measurements.

23 Claims, 11 Drawing Sheets

(56) References Cited

U.S. PATENT DOCUMENTS

| | | | |
|---|---|---|---|
| 7,257,049 | B1 | 8/2007 | Laws et al. |
| 7,492,665 | B2 | 2/2009 | Robertsson et al. |
| 7,817,495 | B2 | 10/2010 | Ozbek et al. |
| 8,456,950 | B2 | 6/2013 | Hegna |
| 9,310,502 | B2 | 4/2016 | Ozdemir et al. |
| 9,594,174 | B2 | 3/2017 | Goujon et al. |
| 10,126,452 | B2 | 11/2018 | Halliday et al. |
| 2002/0118602 | A1 | 8/2002 | Sen et al. |
| 2005/0013194 | A1 | 1/2005 | Vaage et al. |
| 2008/0192571 | A1 | 8/2008 | Vaage et al. |
| 2008/0275649 | A1* | 11/2008 | Ozdemir ............... G01V 1/28 702/14 |
| 2010/0039892 | A1 | 2/2010 | Ray et al. |
| 2010/0211320 | A1 | 8/2010 | Vassallo et al. |
| 2010/0211321 | A1 | 8/2010 | Ozdemir et al. |
| 2010/0271904 | A1* | 10/2010 | Moore ............... G01V 1/3808 367/73 |
| 2011/0069581 | A1 | 3/2011 | Krohn |
| 2011/0182140 | A1 | 7/2011 | Lambert et al. |
| 2012/0188845 | A1 | 7/2012 | Jeffryes |
| 2012/0250460 | A1 | 10/2012 | Edme et al. |
| 2012/0316844 | A1 | 12/2012 | Shah et al. |
| 2013/0060544 | A1 | 3/2013 | Bakker et al. |
| 2013/0128696 | A1 | 5/2013 | Vassallo et al. |
| 2013/0135965 | A1* | 5/2013 | Ji ............... G01V 1/364 367/21 |
| 2013/0182533 | A1 | 7/2013 | Rentsch-Smith |
| 2013/0182536 | A1 | 7/2013 | Vassallo et al. |
| 2013/0329520 | A1* | 12/2013 | van Borselen ............ G01V 1/28 367/24 |
| 2014/0022860 | A1* | 1/2014 | Van Borselen ......... G01V 1/364 367/24 |
| 2014/0029378 | A1 | 1/2014 | Van Manen et al. |
| 2014/0133274 | A1 | 5/2014 | Muijzert et al. |
| 2014/0200812 | A1 | 7/2014 | Kitchenside |
| 2014/0211589 | A1 | 7/2014 | Maxwell |
| 2014/0219055 | A1 | 8/2014 | Goujon et al. |
| 2014/0241117 | A1 | 8/2014 | Dellinger et al. |
| 2014/0278116 | A1 | 9/2014 | Halliday et al. |
| 2014/0278119 | A1 | 9/2014 | Halliday et al. |
| 2014/0316709 | A1 | 10/2014 | Ji et al. |
| 2014/0355379 | A1 | 12/2014 | Moldoveanu et al. |
| 2014/0369161 | A1 | 12/2014 | Sallas et al. |
| 2014/0369163 | A1 | 12/2014 | Sallas et al. |
| 2015/0057938 | A1 | 2/2015 | Krohn et al. |
| 2015/0066374 | A1 | 3/2015 | Ji et al. |
| 2015/0134259 | A1 | 5/2015 | Vassallo et al. |
| 2015/0276955 | A1 | 10/2015 | Brune |
| 2015/0316667 | A1 | 11/2015 | Projetti et al. |
| 2016/0109591 | A1 | 4/2016 | Kamil Amin et al. |
| 2016/0202379 | A1 | 7/2016 | Sallas |
| 2017/0075015 | A1 | 3/2017 | Halliday et al. |
| 2017/0146673 | A1 | 5/2017 | Goujon et al. |
| 2017/0184746 | A1 | 6/2017 | Halliday |
| 2017/0363756 | A1 | 12/2017 | El Allouche et al. |
| 2017/0363757 | A1 | 12/2017 | Halliday et al. |
| 2018/0143338 | A1 | 5/2018 | Halliday |
| 2018/0164461 | A1 | 6/2018 | Halliday et al. |
| 2019/0004198 | A1 | 1/2019 | El Allouche et al. |
| 2019/0079208 | A1 | 3/2019 | Halliday et al. |

FOREIGN PATENT DOCUMENTS

| | | |
|---|---|---|
| CN | 102269823 A | 12/2011 |
| CN | 103329009 A | 9/2013 |
| EP | 0310253 A2 | 4/1989 |
| WO | WO2008152364 A1 | 12/2008 |
| WO | WO2010093652 A2 | 8/2010 |
| WO | WO2010093739 A2 | 8/2010 |
| WO | 2013105062 A1 | 7/2013 |
| WO | 2014110330 A1 | 7/2014 |
| WO | 2014130040 A1 | 8/2014 |
| WO | 2014152106 A1 | 9/2014 |
| WO | 2014177522 A2 | 11/2014 |
| WO | 2014179282 A1 | 11/2014 |
| WO | 2015011160 A1 | 1/2015 |
| WO | 2015109175 A1 | 7/2015 |
| WO | 2015143189 A1 | 9/2015 |
| WO | 2016094332 A1 | 6/2016 |
| WO | 2016168280 A1 | 10/2016 |
| WO | 2016179060 A1 | 11/2016 |
| WO | 2016179206 A1 | 11/2016 |
| WO | 2017096081 A1 | 6/2017 |

OTHER PUBLICATIONS

Hopperstad, J. et al., "Fundamental Principles of Isotropic Marine Source Design", B025, 70th EAGE Conference & Exhibition held in Rome, Italy 2008, 5 pages.

Hopperstad, J-F., et al., "Where is the center of a multi-depth marine source array?", 78th SEG 2008 Annual Meeting, Las Vegas, Nevada, USA, pp. 40-44.

Linden, D. A., "A Discussion of Sampling Theorems", Proceedings of the IRE, 1959, 47(7), pp. 1219-1226.

Lomb, N. R., "Least squares frequency analysis of unequally spaced data", Astrophysics and Space Science, 1976, 39(2), pp. 447-462.

Özbek, O. et al., "Crossline wavefield reconstruction from multicomponent streamer data: Part 2—Joint interpolation and 3D up/down separation by generalized matching pursuit", Geophysics, 2010, 75(6), pp. WB69-WB85.

Ozdemir, A. K. et al., "Interpolation of Irregularly Sampled Data by Matching Pursuit", G025, EAGE Conference & Exhibition held in Rome, Italy 2008, 5 pages.

Papoulis, A., "Generalized Sampling Expansion", IEEE Transactions on Circcuits and Systems, 1977, 24(11), pp. 652-654.

Scargle, J. D., "Studies in Astronomical Time Series Analysis II. Statistical Aspects of Spectral Analysis of Unevenly Sampled Data", Astrophysical Journal, 1982, 263, pp. 835-853.

Vassallo, M. et al., "Crossline wavefield reconstruction from multicomponent streamer data: Part 1—Multichannel Interpolation by matching pursuit (MIMAP) using pressure and its crossline gradient" Geophysics, 2010, 75(6), pp. WB53-WB67.

Search Report and Written Opinion of International Patent Application No. PCT/US2015/028002 dated Jul. 24, 2015, 9 pages.

International Preliminary Report on Patentability of International Patent Application No. PCT/US2015/028002, dated Nov. 10, 2016, 7 pages.

Search Report of European Patent Application No. 15785227.8, dated Nov. 11, 2017, 3 pages.

Search Exam of European Patent Application No. 15785227.8, dated Mar. 12, 2018, 7 pages.

Office Action issued in the related CN Application 201580025632.6, dated Mar. 23, 2018 (29 pages).

Amundsen, L. et al., "Multicomponent ocean bottom and vertical cable seismic acquisition for wavefield reconstruction", Geophysics, 2010, 75(6), pp. WB87-WB94.

Hampson, G. et al., "Effects of Source and Receiver Motion on Seismic Data", 1990, SEG Technical Program Abstracts, pp. 859-862.

Kristiansen, P. et al., "Deepwater OBN—Exploiting data-processing possibilities", SEG Technical Program Abstracts, 2014, pp. 4258-4262.

Mallat, S. et al, "Matching Pursuits with Time-Frequency Dictionaries", IEEE Transactions on Signal Processing, 1993, 41(12), pp. 3397-3415.

Moore, et al., "Simultaneous Source Separation Using Dithered Sources", SEG Las Vegas 2008 Annual Meeting, pp. 2806-2810.

(56) References Cited

OTHER PUBLICATIONS

Paffenholz, J. et al., "Shear Wave Noise on OBS VZ Data—Part II Elastic Modeling of Scatters in the Seabed", Proceedings of the 75th EAGE Conference & Exhibition, 2006, 5 pages.
Schalkwijk, K. M. et al., "Adaptive decomposition of multicomponent ocean-bottom seismic data into downgoing and upgoing P- and S-waves", Geophysics, 2003, 68(3), pp. 1091-1102.
Aki, K. et al., "Quantitative Seismology", New York: Freeman and company, 1980, 10 pages.
Van Dalen, K., "Multi-component acoustic characterization of porous media", PhD thesis, Delft University of Technology, 2011, 174 pages.
Malischewsky, P. et al., "Love's formula and HN-ratio (ellipticity) of Rayleigh waves", Wave Motion, 2004, 40, pp. 57-67.
Search Report and Written Opinion of International Patent Application No. PCT/US2017/037587 dated Sep. 8, 2017, 17 pages.
International Preliminary Report on Patentability of International Patent Application No. PCT/US2017/037587, dated Dec. 27, 2018, 13 pages.
Office Action received in U.S. Appl. No. 15/624,403 dated Mar. 13, 2019, 11 pages.
International Preliminary Report on Patentability of International Patent Application No. PCT/US2017/037586, dated Dec. 27, 2018, 11 pages.
Office Action Issue in U.S. Appl. No. 15/624,669, dated Aug. 31, 2018, 7 pages.
Search Report and Written Opinion of International Patent Application No. PCT/US2017/037586, dated Sep. 8, 2017, 14 pages.
Search Report and Written Opinion of International Patent Application No. PCT/US2016/030344, dated Sep. 21, 2016, 13 pages.
International Preliminary Report on Patentability for International patent application PCT/US2016/030344, dated Nov. 16, 2017, 12 pages.
Search Report and Written Opinion of International Patent Application No. PCT/US2016/030636, dated Aug. 12, 2016, 15 pages.
International Preliminary Report on Patentability of International Patent Application No. PCT/US2016/030636, dated Nov. 16, 2017, 12 pages.
Search Report in related European Patent Application No. 16789960.8 dated Nov. 19, 2018, 3 pages.
Second Office Action issued in Chinese Patent Application No. 201580025632.6, dated Feb. 21, 2019, 18 pages with English Translation.
Search Report and Written Opinion of International Patent Application No. PCT/US2016/064481, dated Mar. 17, 2017, 18 pages.
International Preliminary Report on Patentability of International Patent Application no. PCT/US2016/064481, dated Jun. 14, 2018, 15 pages.
Halliday, D. et al., "Full-wavefield, towed-marie seismic acquisition and applications", SEG Technical Program Expanded Abstracts, 2012, pp. 1-5.
Extended Search Report in European Patent Application No. 16789874.1 dated Apr. 30, 2019, 7 pages.
Third Office Action issued in Chinese Patent Application No. 201580025632.6, dated Jul. 25, 2019, 19 pages with English Translation.

* cited by examiner

WAVEFIELD RECONSTRUCTION

This application claims the benefit under 35 U.S.C. § 119(e) to U.S. Provisional Patent Application Ser. No. 61/985,293 entitled, "WAVEFIELD RECONSTRUCTION BY EXTENDED GENERALIZED MATCHING PURSUIT AND FINITE DIFFERENCES," which was filed on Apr. 28, 2014, and is hereby incorporated by reference in its entirety for all purposes.

BACKGROUND

Seismic exploration involves surveying subterranean geological formations for hydrocarbon deposits. A survey typically involves deploying seismic source(s) and seismic receivers at predetermined locations. The sources generate seismic waves, which propagate into the geological formations creating pressure changes and vibrations along the way. Changes in elastic properties of the geological formation scatter the seismic waves, changing the direction of propagation and other properties of the seismic waves. Part of the energy emitted by the sources reaches the seismic receivers. Some seismic receivers are sensitive to pressure changes (e.g. hydrophones or the like), others to particle motion (e.g., geophones or the like), and industrial surveys may deploy only one type of receivers or both. In response to the detected seismic events, the receivers generate electrical signals to produce seismic data. Analysis of the seismic data can be processed to indicate the presence or absence of probable locations of hydrocarbon deposits. Additionally, seismic sources and receivers may be used to monitor hydrocarbon production and/or the like from a subterranean reservoir.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic receiver-containing streamers and sources is towed behind a survey vessel. In "land" surveys, seismic sources and receivers may be set up at the land/air interface and/or in boreholes or the like.

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In accordance with an example implementation, a technique for reconstructing a seismic wavefield includes receiving data over one or more channels of a plurality of channels from a plurality of stations. The data is recorded by a plurality of seismic receivers and represent measurements of properties of the seismic wavefield. Each station includes a region in space including one or more seismic receivers. Each channel either measures a property of the seismic wavefield or a property of the seismic wavefield after the seismic wavefield has undergone a known transformation. At least one channel is derived as a function of one or more other channels. The technique includes using a processor based machine to process the data to model the seismic wavefield as a sum of basis functions; apply to the basis functions at least one forward transformation that describes the measurements received over the channel(s); and determine optimum basis functions based at least in part on the measurements.

In accordance with another example implementation, a technique for reconstructing a seismic wavefield includes receiving data from one or more stations in response to one or more seismic source arrays operating in one or more seismic source array configurations. The data is recorded by one or more seismic receivers and represent measurements of properties of a seismic wavefield excited by the seismic source array(s) operating in the seismic source array configuration(s). Each seismic source array configuration is associated with a source location and is associated with a configuration of one or more seismic source elements. Each seismic source array configuration emits energy that has an associated radiation pattern. The technique includes using a processor based machine to process the data to model the seismic wavefield to be reconstructed as a sum of basis functions; apply to the basis functions at least one forward transformation describing the emitted radiation pattern associated with the source array configuration(s); and determine optimum basis functions based at least in part on the measurements.

In accordance with another example implementation, a technique includes receiving data over one or more channels of a plurality of channels from a plurality of stations. The data are recorded by a plurality of receivers and represent measurements of properties of a signal to be reconstructed. Each station includes a region in space including one or more receivers. Each channel either measures a property of the signal or a property of the signal after the signal has undergone a known transformation. At least one channel is derived as a function of one or more other channels. The technique includes using a processor based machine to process the data to model the signal as a sum of basis functions; apply to the basis functions at least one forward transformation that describes the measurements received over the channel(s); and determine optimum basis functions based at least in part on the measurements.

In accordance with another example implementation, a system includes an interface to receive data over one or more channels of a plurality of channels from a plurality of stations. The data are recorded by a plurality of seismic receivers and represent measurements of properties of a seismic wavefield to be reconstructed. Each station includes a region in space including one or more seismic receivers. Each channel either measures a property of the seismic wavefield or a property of the seismic wavefield after the seismic wavefield has undergone a known transformation. At least one channel is derived as a function of one or more other channels. The system includes a processor to process the data to model the seismic wavefield as a sum of basis functions; apply to the basis functions at least one forward transformation that describes the measurements received over the channel(s); and determine optimum basis functions based at least in part on the measurements to reconstruct the seismic wavefield.

In accordance with yet another example implementation, a system includes an interface to receive data from one or more stations in response to one or more seismic source arrays operating in one or more seismic source array configurations. The data are recorded by one or more seismic receivers and represent measurements of properties of a seismic wavefield excited by the seismic source array(s) operating in the seismic source array configuration(s). Each seismic source array configuration is associated with a source location and is associated with a configuration of one or more seismic source elements. Each seismic source array configuration emits energy that has an associated radiation pattern. The system includes a processor to process the data to model a seismic wavefield to be reconstructed as a sum of basis functions; apply to the basis functions at least one forward transformation describing the emitted radiation pattern associated with the source array configuration(s); and determine optimum basis functions based at least in part on the measurements.

Advantages and other features will become apparent from the following drawings, description and claims.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

Figure 1A:
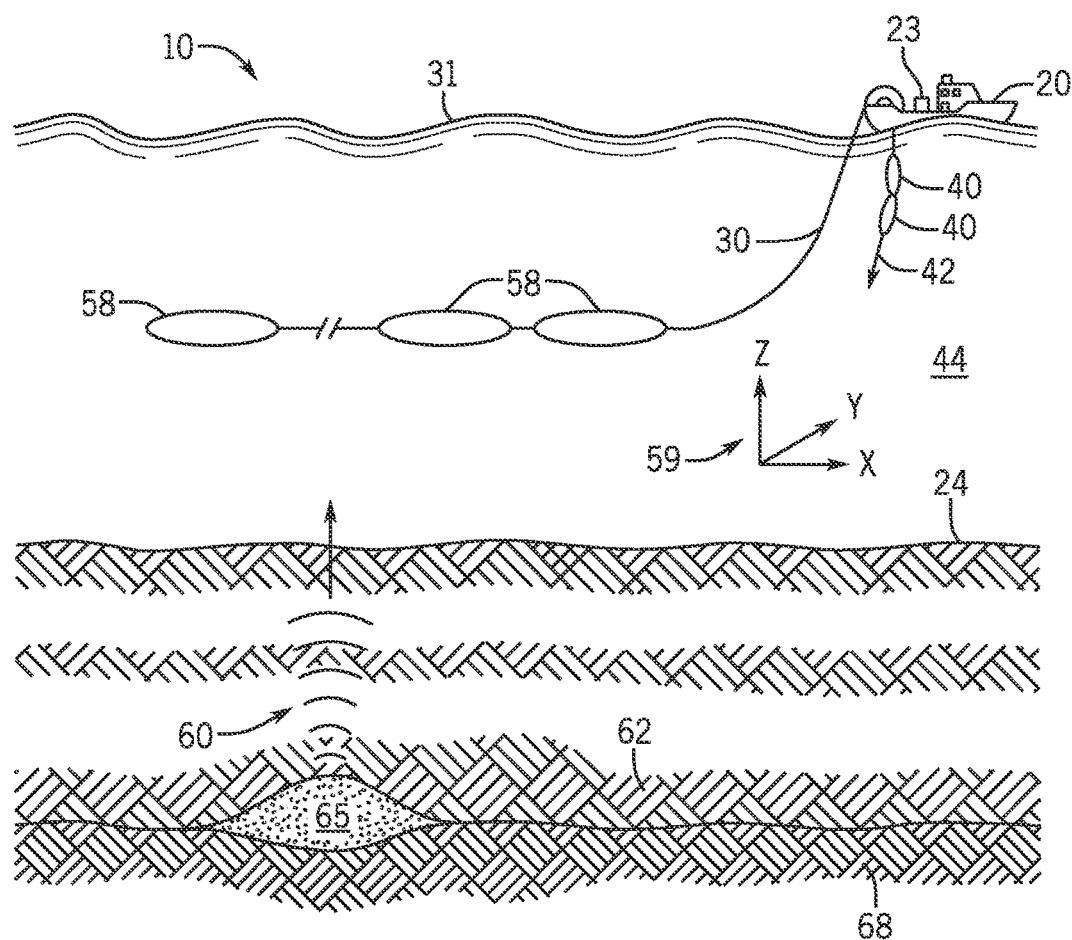
FIG. 1A is a schematic diagram of a marine seismic acquisition system according to an example implementation.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Furthermore, the ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

This disclosure relates to methods for reconstructing a signal from multiple measurements made at discrete locations of the signal and/or versions of the signal after it has undergone a transformation and/or been filtered. As such the methods provide for among other things interpolation and/or deghosting of the signal. In addition, the methods may be used to remove the effect of source radiation patterns and/or reconstruct source wavefields. The methods that are described herein may be used in situations with multidimensional geometries (no limit on dimensions), an arbitrary number of channels per station, channel transfer functions that can change from point to point and/or the like.

Figure 1B:
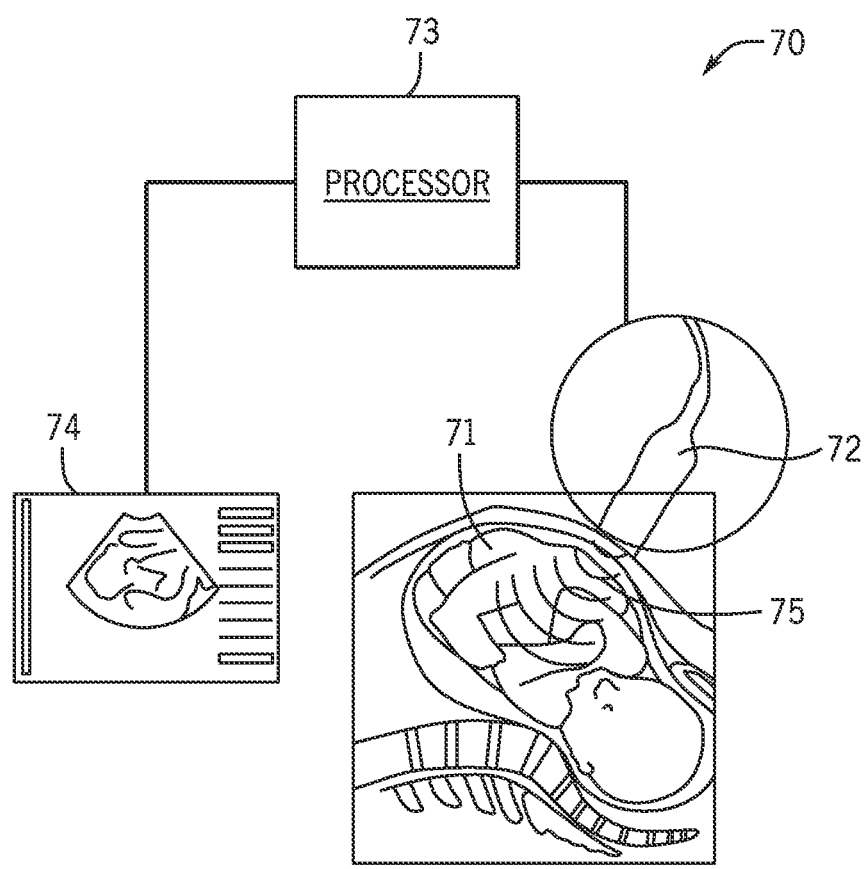
FIG. 1B is a schematic diagram of an ultrasound imaging data acquisition, processing and display system according to an example implementation.
Figure 1C:
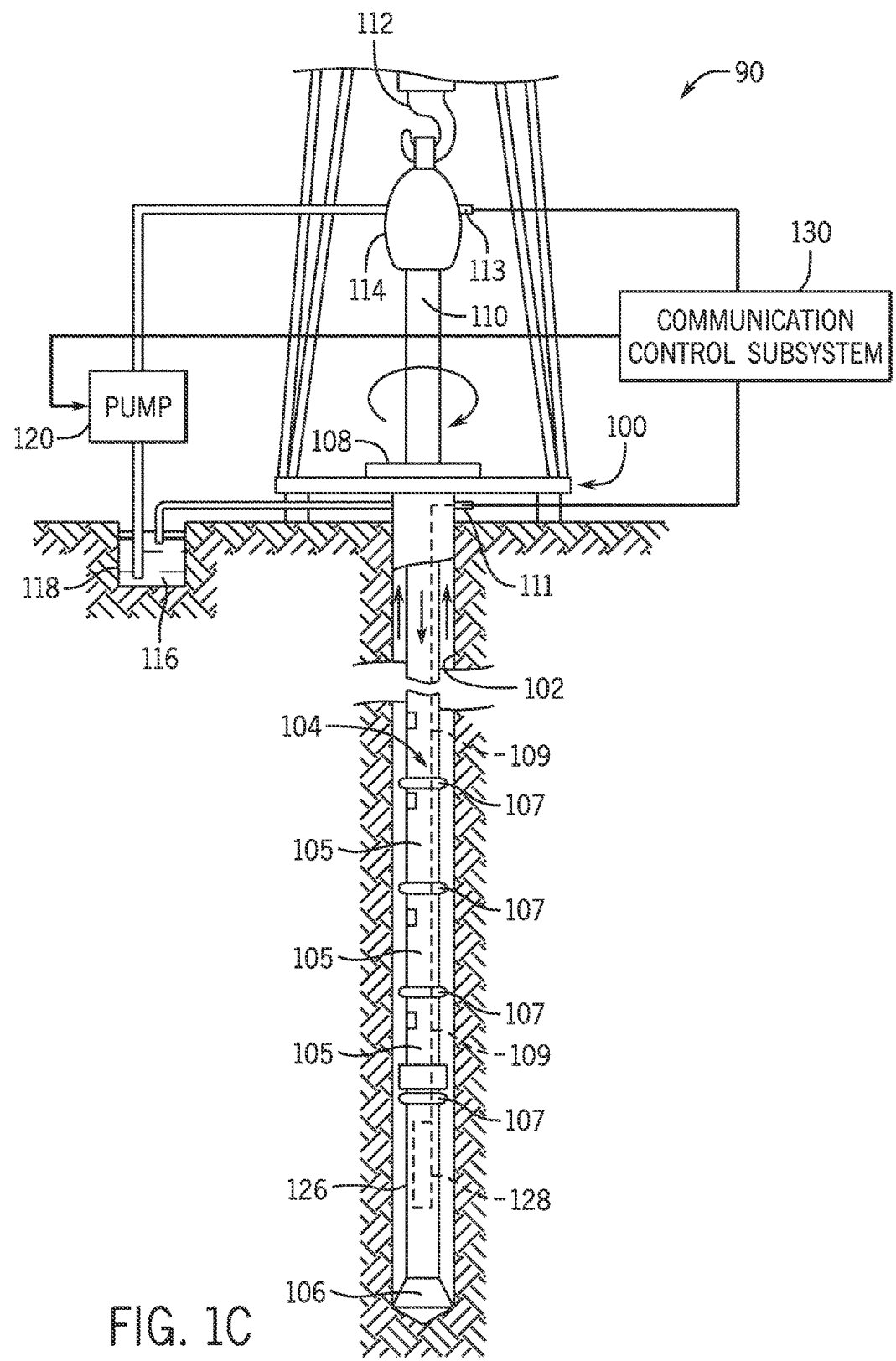
FIG. 1C is a schematic diagram of a drilling system according to an example implementation.

FIGS. 1A, 1B and 1C illustrate wave propagation systems in different industries. The data acquired are processed and used for various uses.

FIG. 1A illustrates a data acquisition system for a marine seismic survey. In the system 10, a survey vessel 20 tows one or more seismic streamers 30 (one streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which seismic receivers that record seismic data are mounted. The streamers 30 contain seismic receivers 58, which may be hydrophones to acquire pressure data, or multi-component receivers. For example, receivers 58 may be multi-component receivers; each receiver may be capable of detecting a pressure wavefield and at least one component of a particle motion that is associated with acoustic signals that are proximate to the receiver. Examples of particle motions include one or more components of a particle displacement, one or more components (inline (x), crossline (y) and vertical (z) components (see axes 59, for example)) of a particle velocity and one or more components of a particle acceleration.

The marine seismic data acquisition system 10 includes one or more seismic sources 40 (two seismic sources 40 being depicted in FIG. 1A), such as air guns and the like. The seismic sources 40 may be coupled to, or towed by, the survey vessel 20. The seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an acoustic signal 42 being depicted in FIG. 1A), often referred to as "shots," are produced by the seismic sources 40 and are directed down through a water column 44 into strata 62 and 68 beneath a water bottom surface 24. The acoustic signals 42 are reflected from the various subterranean geological formations (or targets), such as a formation 65 that is depicted in FIG. 1.

The incident acoustic signals 42 that are generated by the sources 40 produce corresponding reflected acoustic signals reflected by the targets, or pressure waves 60, which are sensed by the seismic receivers 58. It is noted that the pressure waves that are received and sensed by the seismic receivers 58 include "upgoing" pressure waves that propagate to the receivers 58 without reflection from the air-water boundary 31, as well as "downgoing" pressure waves that are produced by reflections of the pressure waves 60 from an air-water boundary 31.

The goal of the seismic acquisition is to build up an image of a survey area for purposes of identifying subterranean geological formations or targets, such as the geological formation 65. Subsequent analysis of the representation may reveal probable locations of hydrocarbon deposits in subterranean geological formations. Depending on the particular survey design, portions of the analysis of the representation may be performed on the seismic survey vessel 20, such as by the signal processing unit 23. In other surveys, the representation may be processed by a seismic data processing system.

FIG. 1B illustrates an ultrasound imaging data acquisition, processing and display system 70. The target 71 (a fetus) is to be imaged using a transducer 72, which includes both a source and a receiver. The transmitted signal and received reflection signal (ultrasound waves 75) from the transducer 72 are sent to a processor 73. The processor 73 collects and processes the signals and converts them into a human visible image 74 and displays the image 74 on a screen. A medical care-giver may use the image 74 to monitor the condition of the fetus. In this system, the primary wave is an ultrasound wave.

FIG. 1C illustrates a drilling system 90 where communication between downhole equipment and surface controllers is performed by a telemetric system using wired drill strings/wired drill pipe. As shown in FIG. 1C, a platform and a derrick 100 are positioned over a borehole 102 that is formed in the earth by rotary drilling. A drill string 104 is suspended within the borehole 102 and includes a drill bit 106 at its lower end.

The drill string 104 and drill bit 106 attached thereto are rotated by a rotating table 108 which engages a kelly 110 at the upper end of the drill string 104. The drill string 104 is suspended from a hook 112 attached to a traveling block (not shown). The kelly 110 is connected to the hook 112 through a rotary swivel 114 which permits rotation of the drill string 104 relative to the hook 112. Alternatively, the drillstring 104 and the drill bit 106 may be rotated from the surface by a "top drive" type of drilling rig.

The drill string 104 includes a bottomhole assembly (BHA) 126, which is mounted close to the bottom of the drill string 104 proximate the drill bit 106. The BHA 126 generally includes capabilities for measuring, processing and storing information, and for communicating with the earth's surface, such as via a local communications subsystem 128 that communicates with a similar communications subsystem 130 at the earth's surface. One of the technologies that the local communications subsystem 128 uses to communicate with the surface communications system 130 is through the use of one or more communication channels provided by a wired drill pipe.

For instance, as shown in FIG. 1C, the drill string 104 includes multiple sections of wired drill pipe 105 interconnected with couplers 107. Each section of wired drill pipe 105 contains one or more communication channels within the pipe, such as the communication channel 109 shown schematically in FIG. 1C. The couplers 107 are configured to mechanically couple the sections of wired drill pipe 105 to one another and to couple the sections of the communication channel(s) 109 so as to form a contiguous communication channel 109 from one end of the series of interconnected sections of wired drill pipe to the other end.

The lowermost end of the wired drill pipe 105 is coupled to the BHA 126 such that the local communications subsystem 128 can transmit and receive communications via the communication channel 109. The uppermost end of the wired drill pipe 105 is coupled through a coupler 111 to the surface communication subsystem 130. In this manner, the communication channel(s) 109 may be used to transmit signals (e.g., telemetry signals or data, command signals, etc.) between the surface and the BHA 128, as well as various other downhole components that may be coupled to the communication channel(s) 109. The drilling system 90 may include seismic receivers for purposes of acquiring seismic data to guide drilling operations. The drilling system 90 may further include one or multiple seismic sources that may be disposed in the borehole 102 and/or on the Earth surface.

The communication path between the downhole equipment and the surface has many intermediate sections, connectors or couplers where the impedances among the wires or the connectors are different. All the different wires or connectors may cause different reverberations in transmission or reflection. The reverberations may overlap with coded signals that may cause confusion, errors or loss of communication bandwidth.

Seismic receivers and/or seismic sources may also be disposed in the borehole 102 after drilling operations are complete. In this manner, the resulting acquired seismic data may be processed for purposes of determining nearfield formation characteristics; and the seismic survey system may include seismic receivers in and/or out of the borehole 102 as well as one or multiple seismic sources that are disposed in and/or out of the borehole 102.

For simplicity, all of the specific examples that are described below are related to seismic imaging in seismic exploration, in which the waves emitted by sources are reflected by the target and received by receivers. The subsurface media contains different layers and interfaces between the layers. The different layers cause undesirable internal reverberations that need to be dealt with or avoided. However, the methods are equally applicable to propagating wave systems that have interfaces in the wave traveling path in any arrangement, as long as the waves emitted by the sources are disturbed in some way by the target or interfaces and the disturbed waves are received by the receivers. The receivers can be on both sides. Some examples of non-seismic systems include at least, remote sensing with electromagnetic waves, biomedical imaging, non-destructive imaging and telecommunications.

Seismic data may also be acquired using a land seismic survey system, which includes one or multiple seismic vibrators that are disposed along the Earth surface and an array of surface-located seismic receiver units that contain seismic receivers to sense seismic energy that is produced by the vibrator(s). In this regard, as part of operations associated with a vibroseis survey, the seismic vibrator(s) generate vibroseis seismic sweeps. The sweeps, in turn, inject corresponding vibroseis sweep signals into the Earth; and these signals are reflected by the surveyed subsurface geologic structure to produce corresponding reflected signals that are detected by the surface-disposed seismic receiver units. A data acquisition system of the survey system may receive the raw seismic data acquired by the seismic receiver units; and the raw seismic data may then be processed to yield information about subsurface reflectors and the physical properties of the surveyed geologic structure.

The different waves (propagative or dissipative), sources, or receivers in different industries do not affect the wave propagation properties and the imaging processes. In seismic imaging, the wave is an elastic wave or an acoustic wave. The target is a subsurface geological structure. The sources are elastic or acoustic wave generators (e.g. airguns, vibrators) and the receivers are pressure or particle motion receivers (e.g. geophones, hydrophones, accelerometers or similar).

A datum as in "redatum" refers to a standard position or level that measurements are taken from. Data refers to the measurements or their representations in various formats. Data redatuming refers to a process in which the data are transformed as if the measurements are taken from a new location or a new level. Additionally, a "datum" here implies a surface that need not be horizontal and/or flat, and includes any geometrically conceivable surface.

In accordance with specific examples that are described herein, data that represent indirect and/or direct measurements of a signal are processed for purposes of reconstructing the signal. For specific examples described herein, the signal may be a seismic wavefield (a pressure wavefield or particle motion wavefield, as examples), and seismic data (acquired by seismic receivers), which represent one or more properties of the seismic wavefield are processed for purposes of reconstructing the seismic wavefield. More specifically, in accordance with example implementations that are described herein, a parametric matching pursuit-based technique, called an "Extended Generalized Matching Pursuit-based technique," or "EGMP-based technique," herein, is used solve the reconstruction problem. The EGMP-based technique is an extension of the Generalized Mapping Pursuit (GMP)-based technique, which is described in U.S. Pat. No. 7,817,495, entitled, "JOINT INTERPOLATION AND DEGHOSTING OF MULTICHANNEL SEISMIC DATA," which issued on Oct. 19, 2010. The EGMP-based technique may be used to reconstruct a seismic wavefield or, in general, reconstruct any signal of which no direct samples of the signal may be available.

The seismic data may be acquired in a land survey (a borehole survey, a vibroseis survey, and so forth) or in a marine survey (a towed survey system, an ocean bottom cable (OBC) survey, a survey in which receiver pods are deployed on the ocean bottom, and so forth). The survey may comprise seismic monitoring of hydrocarbon production from a subterranean reservoir. In particular, the seismic data may be acquired by a plurality of multichannel sensors (called "receivers" herein), such as hydrophones, inline particle motion receivers, vertical particle motion receivers, gradient receivers, and so forth. In this regard, a particular type of measurement is associated with a channel. As, such a particular channel measures a given property, such as pressure, of the seismic wavefield; another channel may measure another property of the seismic wavefield, such as vertical particle motion of the seismic wavefield; and so forth.

In example implementations that are described herein, the processing of the seismic data to reconstruct the seismic wavefield takes into account one or more actual measurement channels (pressure and particle motion channels, for example) that directly measure properties of the seismic wavefield, as well as at least one constructed measurement channel that measures a property of the seismic wavefield after the seismic wavefield has undergone a known forward transformation. Moreover, a given forward transformation may be used, in accordance with example implementations, to derive a given constructed measurement channel from one or more of the actual measurement channels.

The seismic receivers are spatially organized or arranged according to associated stations. In this manner, in accordance with example implementations, the station is a region in space that includes one or more seismic receivers. In accordance with example implementations that are described herein, the station may be associated with a one-dimensional (1-D), two-dimensional (2-D) or three-dimensional (3-D) space.

In accordance with example implementations, the seismic wavefield, may be considered to be an unknown signal called "s(x)," and the seismic wavefield may be modeled as a sum of parametric basis functions $\beta(x;\theta_p)$ with parameter set $\theta_p$, as described below:

$$s(x) = \sum_p \beta(x; \theta_p). \quad \text{Eq. 1}$$

In Eq. 1, "x" denotes a point in multi-dimensional coordinates. There are various basis functions that may be used. As an example, for seismic applications, the following exponential basis function may be used:

$$\beta(x;\theta_p) = c_p \exp(jk_p \cdot x), \quad \text{Eq. 2}$$

where the parameter set "$\theta_p$" includes a complex amplitude $c_p$ and wavenumber vector $k_p$. With this choice, the basis functions correspond to local plane waves. It is assumed that an additional dimension may be present (such as time or temporal frequency), but this dependence is suppressed in the following discussion for the sake of simplicity, without loss of generality. It is assumed, therefore, in the following equations, for purposes of clarity and simplicity that the temporal frequency is fixed.

From a seismic survey or the like, measurements of the unknown signal s(x) are available at discrete positions in space. In the following discussion, the discrete positions are the positions of the stations. At each station, receivers record multichannel measurements of the unknown signal s(x). The number of channels per station may be one or more, in accordance with example implementations.

With multichannel sampling (sometimes called "generalized sampling") each channel senses not necessarily the signal itself, but a version of the signal after it has undergone a known transformation (a filter, for example). Thus, as noted above, the channels include actual measurement channels as well as constructed measurement channels. By way of example, a gradient of the unknown signal s(x) may be sensed at a station.

If there are M types of channels in a multichannel sampling scenario, the set of stations as may be denoted as follows:

$$x_S = \{x_1, x_2, \ldots, x_M\}, \quad \text{Eq. 3}$$

where a given station vector, $x_m$, may be represented as $x_m = \{x_{m1}, x_{m2}, \ldots, m_{xNm}\}$. In this notation, "m"=1, 2, ... M and represents the set of $N_m$ positions that correspond to channel m. A measurement vector $m(x_S)$ may be described as follows:

$$m(x_s) = \begin{bmatrix} m_1(x_1) \\ m_2(x_2) \\ \vdots \\ m_M(x_M) \end{bmatrix}, \quad \text{Eq. 4}$$

where each measurement vector $m_m(x_m)$ contains all the measurements of channel type m, as described below:

$$m_m(x_m) = \begin{bmatrix} m_m(x_{m1}) \\ m_m(x_{m2}) \\ \vdots \\ m_m(x_{mN_m}) \end{bmatrix}. \quad \text{Eq. 5}$$

Each entry $m_m(x_{mn})$ may be described as follows:

$$m_m(x_{mn}) = \sum_p \eta_m(k_p, x_{mn}) c_p \exp(jk_p \cdot x_{mn}), \quad \text{Eq. 6}$$

where "$\eta_m(k_p, x_{xn})$" is a function that describes a forward transformation from the unknown signal s(x) to the measurement channel at spatial positions $x_{mn}$. This formulation is quite general; and in some cases the forward transformation may be independent of spatial coordinates, i.e., could be described by the following function:

$$\eta_m(k_p, x_{mn}) = \eta(k_p) \quad \text{Eq. 7}$$

In accordance with the EGMP-based technique, forward linear filters (i.e., forward transformations) that describe the actual and constructed measurement channels are applied to candidate basis functions; and the filtered basis functions are then optimized by iteratively matching the basis functions to the multichannel measurements. Iteratively, the basis function that, once forward filtered, jointly best matches all the measurements that are used to reconstruct the unknown signal at the desired positions. At the P-th iteration, i.e., after P−1 basis functions have been determined previously, the residual in the measurements may be represented as follows:

$$r^{P-1}(x_s) = m(x_s) - \sum_{p=1}^{P-1} c_p h(k_p, x_s), \text{ where} \quad \text{Eq. 8}$$

$$r^P(x_s) = \begin{bmatrix} r_1^P(x_1) \\ r_2^P(x_2) \\ \vdots \\ r_M^P(x_M) \end{bmatrix} \quad \text{Eq. 9}$$

is the vector of residuals after iteration P. Here, $$r_m^P(x_m) = \begin{bmatrix} r_m^P(x_1) \\ r_m^P(x_2) \\ \vdots \\ r_m^P(x_{mN_m}) \end{bmatrix}, \quad \text{Eq. 10}$$

denotes the vector of residuals for channel m. Vector $h(k_p, x_s)$ of Eq. 8 may be defined as follows:

$$h(k_p, x_S) = \eta(k_p, x_S) \otimes d(k_p, x_s), \quad \text{Eq. 11}$$

where $\otimes$ denotes the Kronecker product, and $$\eta(k, x_s) = \begin{bmatrix} \eta_1(k, x_1) \\ \eta_2(k, x_2) \\ \vdots \\ \eta_M(k, x_M) \end{bmatrix} \quad \text{Eq. 12}$$

is the transfer function vector, with "$\eta_m(k, x_m)$" describing the transfer function from the unknown signal to the measurement channel m at spatial positions $x_m$.

In Eq. 11, "$d(k, x_s)$," the overall steering vector, may be described as follows:

$$d(k, x_s) = \begin{bmatrix} d_1(k, x_1) \\ d_2(k, x_2) \\ \vdots \\ d_M(k, x_M) \end{bmatrix}. \quad \text{Eq. 13}$$

The components of $d(k, x_s)$ is the overall steering vector, whose components may be described as follows:

$$d_m(k, x_m) = \begin{bmatrix} \exp(jk \cdot x_{m1}) \\ \exp(jk \cdot x_{m2}) \\ \vdots \\ \exp(jk \cdot x_{mN_m}) \end{bmatrix}. \quad \text{Eq. 14}$$

The components of $d(k, x_s)$ are defined for each channel m for the spatial positions $x_m = \{x_{m1}, x_{m2}, \ldots, x_{mN_m}\}$ $x_m = \{x_{m1}, x_{m2}, \ldots, m_{xNm}\}$ that correspond to that channel. Entries of the $d(k, x_s)$ steering vector contain the phase shifts at the measurement locations.

At iteration P, if a new candidate basis function $c_p \exp(jk_p \cdot x)$ is added to the existing representation of the signal, the residual becomes the following:

$$r^P(x_S; c_p, k_p) = r^{P-1}(x_S) - c_p h(k_p, x_S), \quad \text{Eq. 15}$$

where the parameters of the new term, i.e., $c_p$ and $k_p$, are to be determined by minimizing a metric of the residual calculated over measurement locations. One possible formulation of the optimization problem is set forth below:

$$(c_P^{OPT}, k_P^{OPT}) = \arg\min [r^P(x_S; c_P, k_P)]^H \Lambda r^P(x_S; c_P, k_P), \quad \text{Eq. 16}$$

where the superscript "H" represents the Hermitian operator, and "$\Lambda$" represents a positive definite matrix. The role of the Λ matrix is to weight the contributions of different measurements to the cost function to be minimized. This weighting may take into account the difference of energy content due to the different physics of the input measurements, as well as account for a signal-to-noise ratio, which may vary in time, space, and frequency.

Solving the optimization problem, it can be shown that the optimal values of $c_p$ and $k_p$ satisfy the following constraint:

$$c_P^{OPT} = g(k_P^{OPT})/\gamma(k_P^{OPT}) \quad \text{Eq. 17}$$

where $$g(k_P) = [h(k_P, x_S)]^H \Lambda r^{P-1}(x_S) \quad \text{Eq. 18}$$

and $$\gamma(k_P) = [h(k_P, x_S)^H \Lambda h(k_P, x_S)] \quad \text{Eq. 19}$$

Substituting Eq. 17 into Eq. 16, provides a cost function for the optimal wavenumber vector that is described below:

$$k_P^{OPT} = \arg\max \mathcal{L}(k_P), \quad \text{Eq. 20}$$

where the cost function may be described as follows:

$$\mathcal{L}(k_P) = |g(k_P)|^2/\gamma(k_P) \quad \text{Eq. 21}$$

Eq. 21 may be referred to as the generalized Lomb spectrum, in analogy with the single-channel interpolation problem. There, in the case of sinusoidal basis functions, the objective function generated by Interpolation by Matching Pursuit (IMAP) with optimal amplitudes in the least-squares sense corresponds to the Lomb spectrum.

An important special case is the following:

$$\Lambda = \text{diag}(\lambda_1, \lambda_2, \ldots \lambda_M) \otimes I_N, \quad \text{Eq. 22}$$

where "$I_N$" represents the N-dimensional identity matrix. For this case, Eqs. 18 and 19 for $g(k_p)$ and $\gamma(k_p)$ simplify as follows:

$$g(k_P) = \sum_{m=1}^{M} \lambda_m \eta_m^*(k_P) d_m^H(k_P, x_m) r_m(x_m), \text{ and} \quad \text{Eq. 23}$$

$$\gamma(k_P) = \sum_{m=1}^{M} N_m \lambda_m |\eta_m(k_P)|^2, \quad \text{Eq. 24}$$

respectively. It is noted that the $d^H_m r_m$ term in $g(k_p)$ corresponds to a DFT (Discrete Fourier Transform), which may be computed using an FFT (Fast Fourier Transform) if the spatial samples in $x_m$ are uniformly located.

Figure 2:
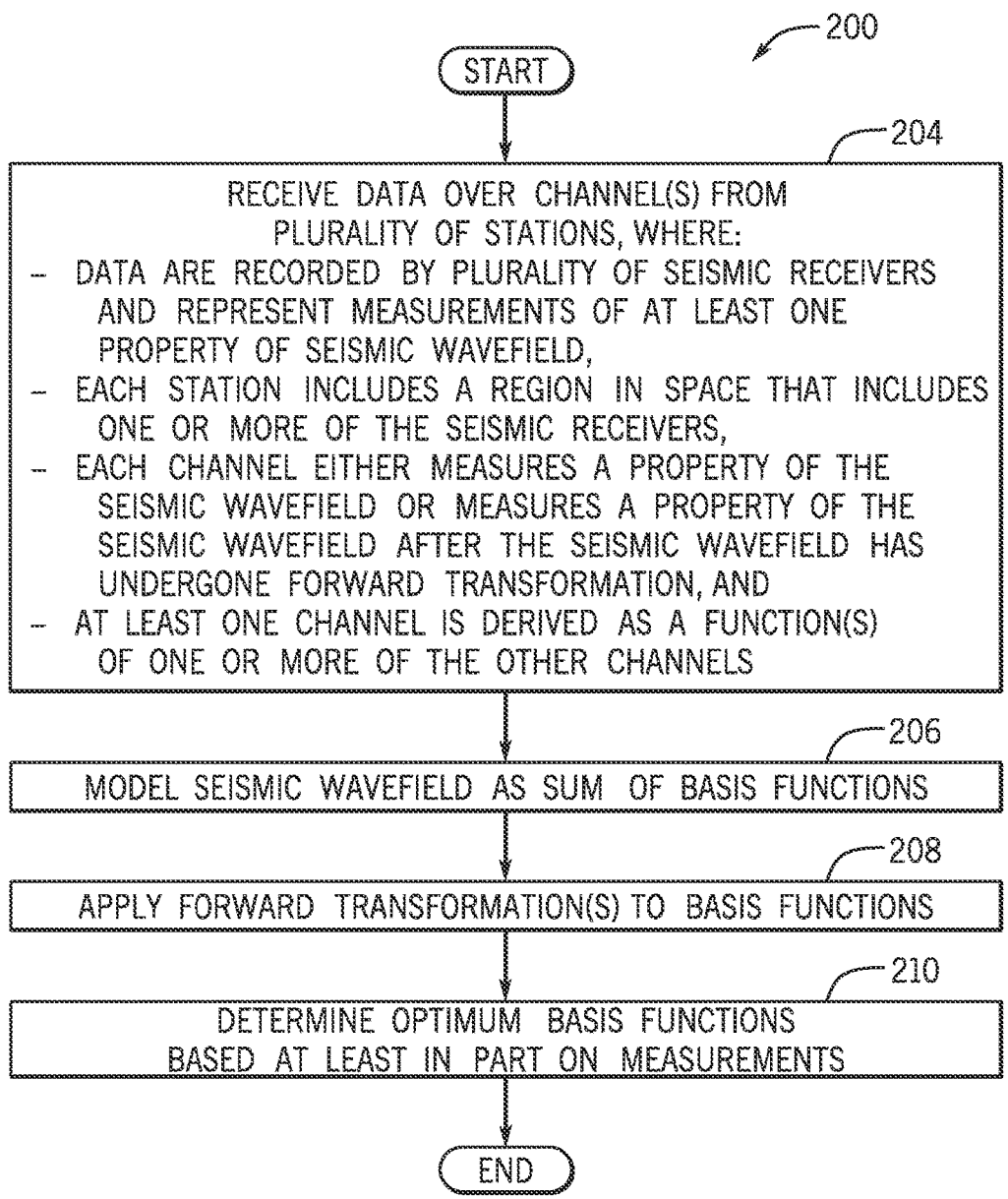
FIGS. 2 and 3 are flow diagrams illustrating Extended Generalized Matching Pursuit (EGMP)-based techniques to reconstruct signals according to example implementations.

In summary, an EGMP-based technique 200, which is depicted in FIG. 2, may be used to reconstruct a seismic wavefield. Referring to FIG. 2, pursuant to the technique 200, data are received (block 204) over one or more channels from a plurality of stations. The data are recorded by a plurality of seismic receivers and represent measurements of at least one property of the seismic wavefield. Each station includes a region in space that includes one or more of the seismic receivers. Each channel either measures a property of the seismic wavefield or measures a property of the seismic wavefield after the seismic wavefield has undergone a known forward transformation; and at least one channel is derived as a function of one or more of the other channels. The technique 200 includes modeling (block 206) the seismic wavefield as a sum of basis functions; applying forward transformations to the basis functions, pursuant to block 208; and determining (block 210) optimum basis functions based at least in part on the measurements. In this manner, in block 210, basis functions that best fit or best describe the measurements may be determined for purposes of optimizing the basis functions, in accordance with example implementations.

Figure 3:
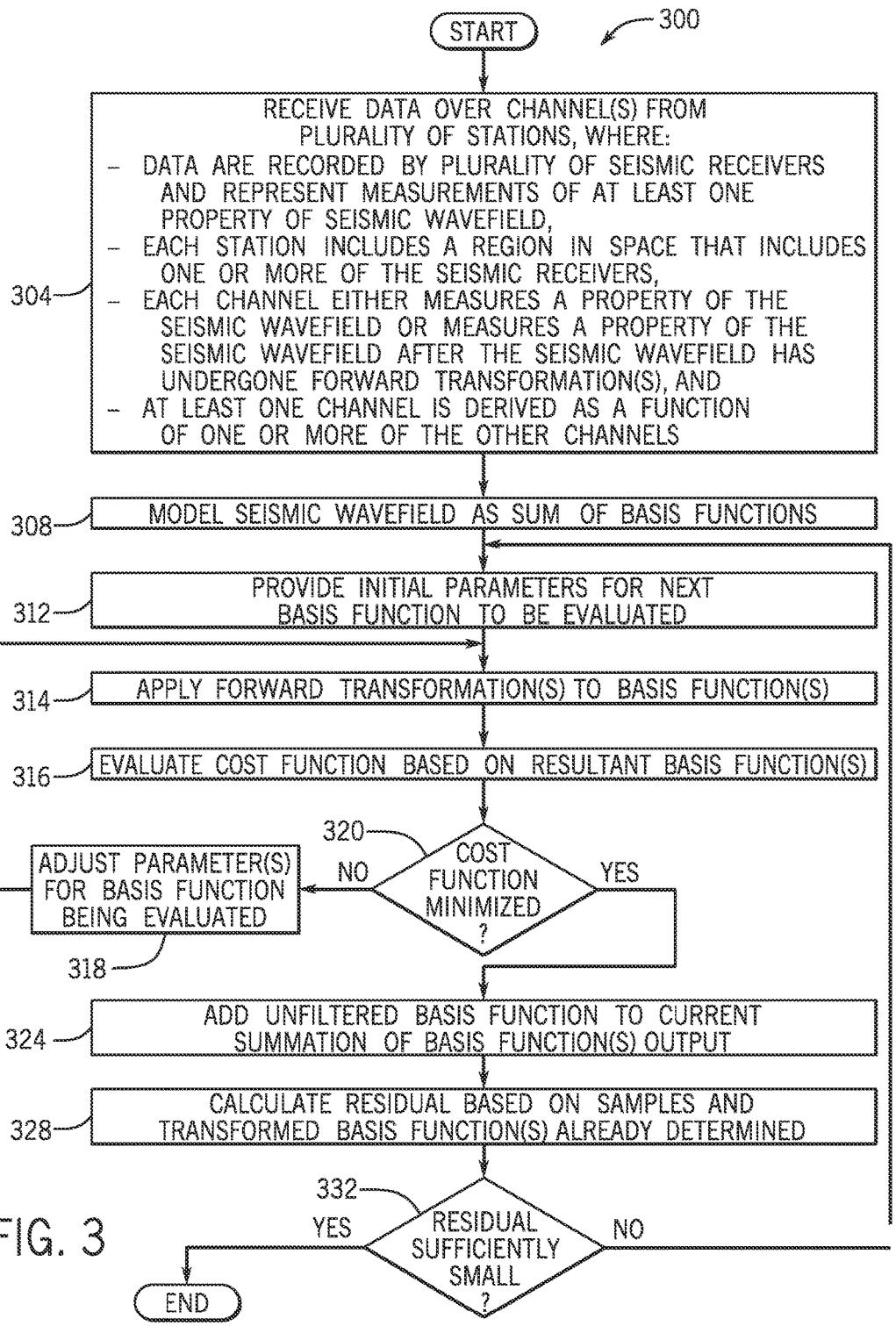

More specifically, referring to FIG. 3, an EGMP-based technique 300 may be used to reconstruct a seismic wavefield, in accordance with example implementations. Pursuant to the technique 300 and similar to blocks 204 and 206 of FIG. 2, seismic data are received (block 304), and the seismic wavefield is modeled (block 308) as a sum of basis functions.

Next, the technique 300 begins an iterative process to determine the basis functions for the seismic wavefield. In this manner, for the example implementation depicted in FIG. 3, the basis functions are determined one at a time. This iterative process first involves providing (block 312) initial parameters for the next basis function; applying (block 314) forward transformations (linear filters, for example) to the basis functions and based on the resultant basis function(s), evaluating a cost function, pursuant to block 316. If a determination is made (decision block 320) that the cost function has not been minimized, one or more parameters for the basis function are adjusted, pursuant to block 318 and control returns to block 314.

Otherwise, if the cost function is minimized, the unfiltered basis function is added (block 324) to the current summation of basis functions already determined; and a residual is calculated (block 328) based on the measurements and the basis function(s) that have already been determined, appropriately filtered by the forward transformations. If a determination is made, pursuant to decision block 332, that the residual is sufficiently small, then the technique 300 terminates. Otherwise, control returns to block 312 to provide the initial parameters for the next basis function.

As a specific example, the EGMP-based technique may be used for Multichannel Interpolation with Matching Pursuit (MIMAP) in one-dimension (1-D). MIMAP is generally described in PCT publication WO 2008/152364 A1, entitled, "METHOD OF REPRESENTING SEISMIC SIGNALS," which published on Dec. 18, 2008.

Figure 4A:
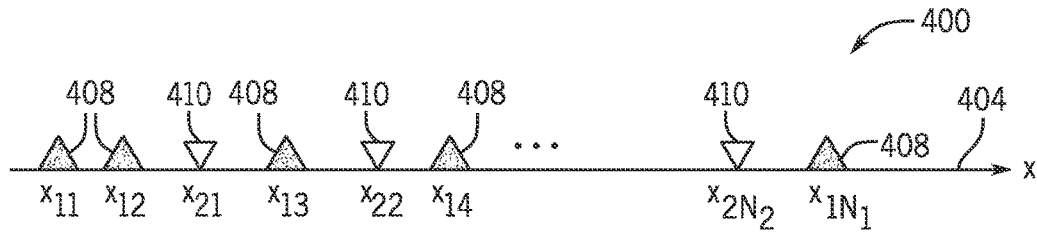
FIG. 4A is an illustration of a one-dimensional (1-D) arrangement of signal and gradient receivers, where the signal and gradient receivers are disposed at different locations according to an example implementation.

FIG. 4A is an illustration 400 of an 1-D survey system in which $N_1$ signal receivers 408 are arranged along an axis x at corresponding positions $x_{11}, x_{12}, x_{13} \ldots X_{1N1}$. The signal receivers 408 directly acquire signal measurements called "$s(x_1)$." As an example, the signal receivers 408 may be receivers that are disposed on a streamer in a marine survey acquisition system. Thus, the receivers 408 are associated with a channel that directly spatially samples the unknown signal at the $x_{11}$ to $x_{1N1}$ positions. One or multiple signal receiver 408 may be associated with a given station, depending on the particular implementation.

Figure 4B:
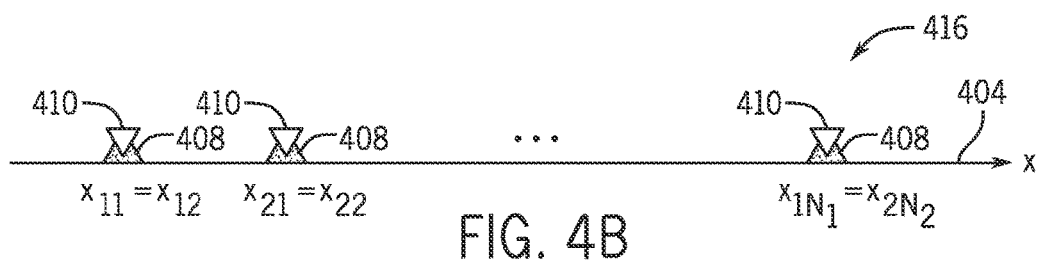
FIG. 4B is an illustration of a 1-D arrangement of signal and gradient receivers, where the signal and gradient receivers are co-located according to an example implementation.

FIG. 4A also depicts $N_2$ gradient receivers 408 that are disposed at positions $x_{21}, x_{22}, x_{23} \ldots x_{2N2}$. For this example, the gradient receivers 408 are not actual receivers that directly measure gradients of the signal; but rather, the gradient receivers 408 represent constructed receivers that are associated with a constructed measurement channel that measures a gradient of the signal at the $x_{21}$ to $x_{2N2}$ positions. It is noted that as illustrated that the constructed gradient receivers 410 may be co-located with the signal receivers 408, in accordance with further, example implementations, as depicted in an illustration 416 of FIG. 4B.

Regardless of whether the signal receivers 408 and gradient receivers 410 are disposed at different locations (FIG. 4A) or co-located (FIG. 4B), there are two types of channels (gradient receivers and signal receivers) and therefore, M=2 channels. The problem is one-dimensional in space, so the unknown wavenumber vector is a scalar k. The measurements $m(x_s)$ at station coordinates $x_S$ may be represented as follows:

$$m(x_s) = \begin{bmatrix} m_1(x_1) \\ m_2(x_2) \end{bmatrix} = \begin{bmatrix} s(x_1) \\ \partial s(x_2)/\partial x \end{bmatrix}. \quad \text{Eq. 25}$$

The signal and its gradient are measured at sets of points $x_1 = \{x_{11}, x_{12}, \ldots x_{1N1}\}$ and $x_2 = \{x_{21}, x_{22}, \ldots x_{2N2}\}$ respectively.

The weighting matrix may be described as follows:

$$\Lambda = \begin{bmatrix} I_{N_1} & 0 \\ 0 & \lambda I_{N_2} \end{bmatrix}, \qquad \text{Eq. 26}$$

and the transfer function vector ii(k) may be described as follows:

$$\eta(k) = \begin{bmatrix} 1 \\ jk \end{bmatrix}, \qquad \text{Eq. 27}$$

which results in $$\gamma(k) = \sum_{m=1}^{2} N_m \lambda_m |\eta_m|^2 = N_1 + \lambda N_2 k^2, \qquad \text{Eq. 28}$$

and $$g(k) = \sum_{m=1}^{2} \lambda_m \eta_m^* d_m^H r_m = d_1^H r_1 - j\lambda k d_2^H r_2. \qquad \text{Eq. 29}$$

In Eq. 29, "$r_1$" and "$r_2$" represent the residuals of signal and gradient measurements, respectively, and "$d_m$," which represents the steering vectors for m=1, 2, may be described as follows:

$$d_m = \left[ e^{jx_{m1}k}, e^{jx_{m2}k}, \cdots, e^{jx_{mN_m}k} \right]^T. \qquad \text{Eq. 30}$$

Once again, the $d^H r$ terms may be computed by FFT for uniformly sampled data.

Figure 4C:
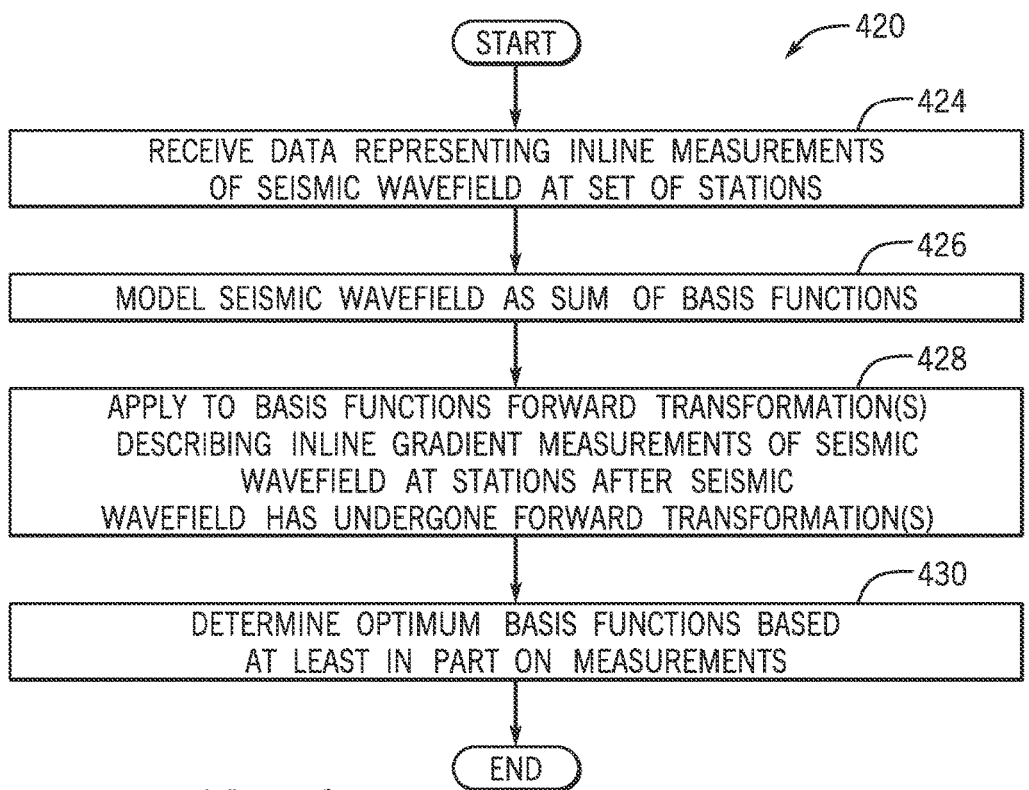
FIG. 4C is a flow diagram depicting a technique to perform EGMP-based Multichannel Interpolation with Matching Pursuit (MIMAP) according to an example implementation.

Thus, referring to FIG. 4C, in a technique 420, data representing inline measurements of a seismic wavefield at a set of stations are received, pursuant to block 424. The wavefield is modeled as a sum of basis functions, pursuant to block 426; and a forward transformation is applied to the basis function, pursuant to block 428, describing the inline gradient measurements of seismic wavefield at stations after the seismic wavefield has undergone the forward transformation. The technique 420 includes determining optimum basis functions based at least in part on the measurements, pursuant to block 430.

Figure 5A:
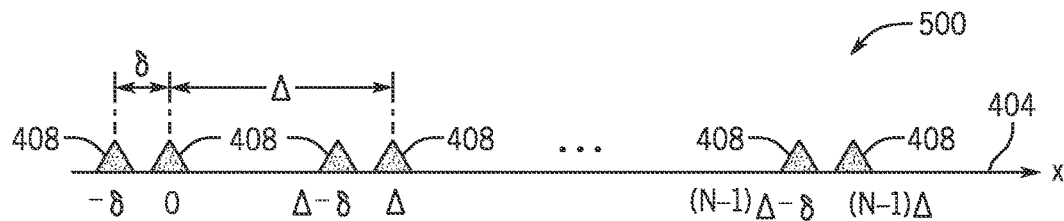
FIG. 5A is an illustration of a 1-D arrangement of signal receivers arranged in pairs according to an example implementation.

The forward transformation for the EGMP-based technique may, in accordance with example implementations, be used to derive a channel that measures finite differences; and this channel, in turn, may be used for purposes of wavefield reconstruction. In this manner, FIG. 5A is an illustration 500 of problem constraints in which a Finite Difference-Multichannel Interpolation with Matching Pursuit (FD-MIMAP) may be used. As depicted in FIG. 5A, pairs of the signal receivers 408 are disposed along the inline axis 404. Each pair 408 is separated by a relatively small distance called "$\delta$" and is associated with a station. In general, the distance $\delta$ may vary from station to station; and the stations are separated by a distance called "$\Delta$." The signal receivers 408 of each pair measure a signals $s(x_S)$ and $s(x_S-\delta)$ for the station coordinates $x_S = \{x_1, x_2, \ldots x_N\}$. From these first set of signals, a second set of signals may be computed, as described below:

$$m(x_S) = \begin{bmatrix} m_1(x_S) \\ m_2(x_S) \end{bmatrix} = \begin{bmatrix} s(x_S) \\ [s(x_S) - s(x_S - \delta)]/\delta \end{bmatrix}. \qquad \text{Eq. 31}$$

In Eq. 31, the second channel contains the finite difference signal. The weighting matrix may be described as follows:

$$\Lambda = \begin{bmatrix} 1 & 0 \\ 0 & \lambda \end{bmatrix} \otimes I_N, \qquad \text{Eq. 32}$$

and the transfer function vector may be described as follows:

$$\eta(k) = \begin{bmatrix} 1 \\ (1 - e^{-j\delta k})/\delta \end{bmatrix} = \begin{bmatrix} 1 \\ je^{-j\delta k/2} \frac{\sin(\delta k/2)}{\delta/2} \end{bmatrix}, \qquad \text{Eq. 33}$$

giving $$\gamma(k) = \sum_{m=1}^{2} N\lambda_m |\eta_m|^2 = N\left(1 + \lambda \frac{\sin^2(\delta k/2)}{(\delta/2)^2}\right), \qquad \text{Eq. 34}$$

and $$g(k) = \sum_{m=1}^{2} \lambda_m \eta_m^* d_m^H r_m = d^H \left( r_1 + \frac{\lambda(1 - e^{j\delta k})}{\delta} r_2 \right). \qquad \text{Eq. 35}$$

In Eq. 35, "$r_1$" and "$r_2$" represent the residuals of signal and finite-difference measurements, respectively, where "d" is the steering vector and may be described as follows:

$$d = [e^{jx_1k}, e^{jx_2k}, \ldots, e^{jx_Nk}]^T \qquad \text{Eq. 36}$$

It is noted that as $\delta \to 0$, $\gamma$ and g for FD-MIMAP tend to those of MIMAP, if $N_1 = N_2 = N$.

In practice, it is advantageous to choose $\delta$ such that $\delta < \lambda_{min}/2$, where $\lambda_{min}$ is the shortest wavelength present in the signal to be reconstructed. When this constraint is satisfied (which is equivalent to requiring that $\delta < \pi/k_{max}$), the $\sin(\delta/2)$ term in Eq. 34 is a monotonic function of wavenumber k, and FD-MIMAP functions in a similar way to MIMAP which has a true gradient measurement (and the corresponding factor of k) in Eq. 28.

It is noted that the measurement vector at a given station may be augmented to also include the second measurement, as described below:

$$m(x_S) = \begin{bmatrix} m_1(x_S) \\ m_2(x_S) \\ m_3(x_S) \end{bmatrix} = \begin{bmatrix} s(x_S) \\ s(x_S - \delta) \\ [s(x_S) - s(x_S - \delta)]/\delta \end{bmatrix}, \qquad \text{Eq. 37}$$

and for this augmentation, the corresponding transfer function vector is described as follows:

$$\eta(k) = \begin{bmatrix} 1 \\ e^{-j\delta k} \\ (1 - e^{-j\delta k})/\delta \end{bmatrix}. \qquad \text{Eq. 38}$$

The weighting matrix may be $\Lambda=\text{diag}(1,1,\lambda)\otimes I_N$ for N stations.

Figure 5B:
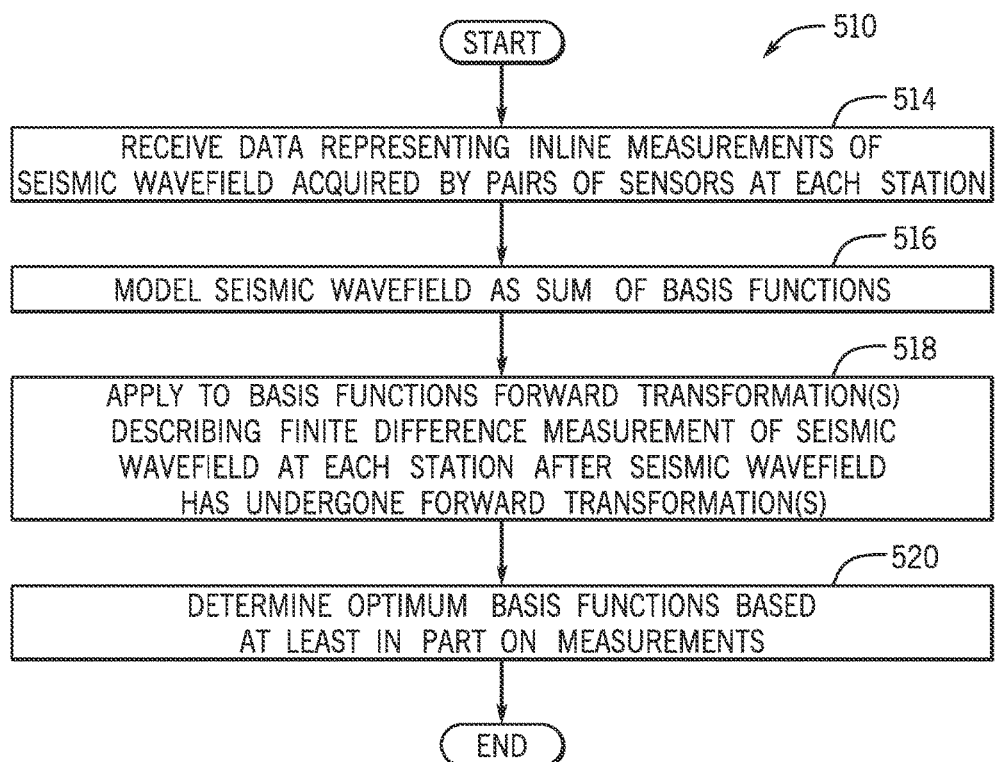
FIG. 5B is a flow diagram depicting a technique to perform EGMP-based Finite Difference-Multichannel Interpolation with Matching Pursuit (FD-MIMAP) according to an example implementation.
Figure 6A:
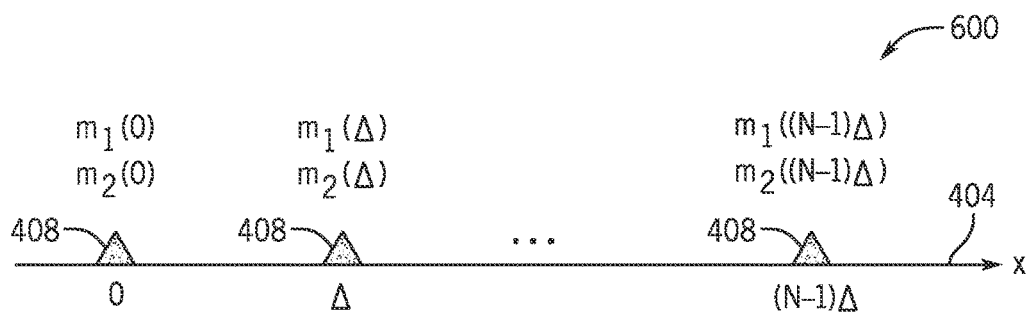
FIG. 6A is an illustration of a 1-D arrangement of receiver positions for performing EGMP-based FD-MIMAP, where the stations are regularly spaced and each station corresponds to a signal channel and a finite difference (FD) channel according to an example implementation.
Figure 6B:
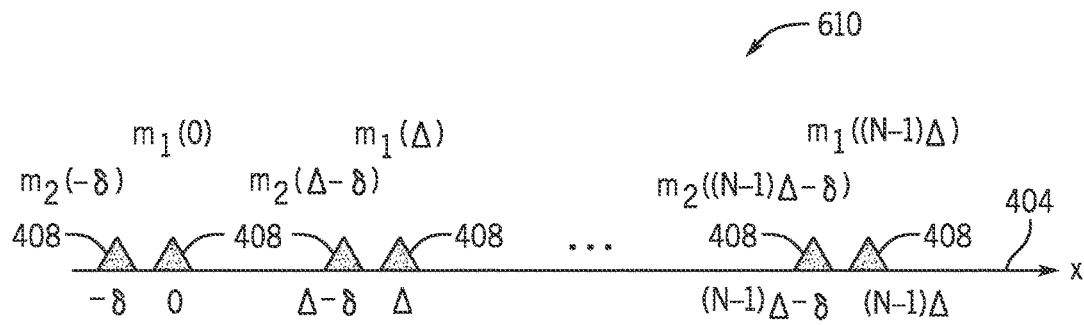
FIG. 6B is an illustration of a 1-D arrangement of receiver positions for performing EGMP-based IMAP, where the stations are regularly spaced and each station contains a pair of signal receivers according to an example implementation.

Thus, referring to FIG. 5B, a technique 500 includes receiving data (block 514) representing inline measurements of seismic wavefield acquired by pairs of receivers at each station and modeling (block 516) the seismic wavefield as a sum of basis functions. The technique 500 includes applying (block 518) a forward transformation to the basis function describing a finite difference measurement of seismic wavefield at each station after seismic wavefield has undergone forward transformation; and determining (block 520) optimum basis functions based at least in part on the measurements.

EGMP processing may be applied to the special case of Interpolation with Matching Pursuit (IMAP) with pairs of receivers. IMAP is generally described in the above-mentioned PCT publication WO 2008/152364 A1.

The data acquisition geometry here is the same as that illustrated in FIG. 5A, i.e., here are pairs of signal receivers 408 at each station, and the receivers 408 of each pair are separated by a relatively small distance $\delta$. The pairs of receivers measure sets of signals $s(x_S)$ and $s(x_S-\delta)$, respectively, with $x_S = \{x_1, x_1, \ldots x_N\}$. The measurements $m(x_S)$ at station coordinates $x_S$ may be described as follows:

$$m(x_S) = \begin{bmatrix} m_1(x_1) \\ m_2(x_2) \end{bmatrix} = \begin{bmatrix} s(x_S) \\ s(x_S-\delta) \end{bmatrix}. \quad \text{Eq. 39}$$

In Eq. 39, the second channel contains the finite difference signal; therefore this formulation and the corresponding method are referred to as FD-MIMAP. The weighting matrix may be represented as follows:

$$\Lambda = I_{2N} \quad \text{Eq. 40}$$

and the transfer function vector may be described as follows:

$$\eta = [1\ 1]^T \quad \text{Eq. 41}$$

The steering vectors may be represented as follows:

$$d_1 = [e^{jx_1 k}, e^{jx_2 k}, \ldots, e^{jx_N k}]^T \quad \text{Eq. 42}$$

and $$d_2 = e^{-j\delta k} d_1, \quad \text{Eq. 43}$$

respectively, giving $$\gamma = \sum_{m=1}^{2} N \lambda_m |\eta_m|^2 = 2N, \quad \text{Eq. 44}$$

and $$g(k) = \sum_{m=1}^{2} \lambda_m \eta_m^* d_m^H r_m = d_1^H (r_1 + e^{j\delta k} r_2). \quad \text{Eq. 45}$$

In Eq. 45, $r_1$ and $r_2$ represent the residuals that correspond to the two channels.

Figure 7:
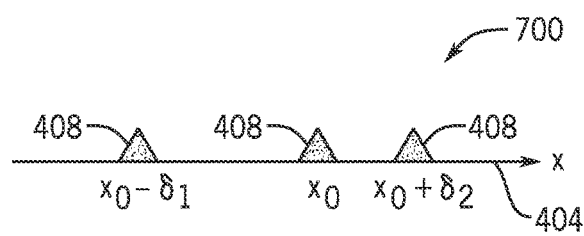
FIG. 7 is an illustration of a 1-D arrangement of receiver positions, where the receivers are positioned at different finite offsets to allow for application of EGMP-based FD-MIMAP using higher order finite differences according to an example implementation.

FD-MIMAP may also be used for higher order finite differences. In this manner, FIG. 7 depicts an illustration in which channels measure 1-D second-order finite differences. The measurement vector at position $x_0$ may be defined to include the measurements and the first and second order finites differences, as described below:

$$m(x_0) = \begin{bmatrix} m_1(x_0) \\ m_2(x_0) \\ m_3(x_0) \\ m_4(x_0) \\ m_5(x_0) \\ m_6(x_0) \\ m_7(x_0) \end{bmatrix} = \begin{bmatrix} s(x_0) \\ s(x_0-\delta_1) \\ s(x_0+\delta_2) \\ [s(x_0)-s(x_0-\delta_1)]/\delta_1 \\ [s(x_0+\delta_2)-s(x_0)]/\delta_2 \\ [s(x_0+\delta_2)-s(x_0-\delta_1)]/(\delta_1+\delta_2) \\ [s(x_0+\delta_2)-2s(x_0)+s(x_0-\delta_1)]/(\delta_1+\delta_2) \end{bmatrix}; \quad \text{Eq. 46}$$

and the corresponding transfer function vector may be described as follows:

$$\eta(k, x_0) = \begin{bmatrix} \eta_1(k) \\ \eta_2(k) \\ \eta_3(k) \\ \eta_4(k) \\ \eta_5(k) \\ \eta_6(k) \\ \eta_7(k) \end{bmatrix} = \begin{bmatrix} 1 \\ e^{-j\delta_1 k} \\ e^{j\delta_2 k} \\ (1-e^{-j\delta_1 k})/\delta_1 \\ (e^{j\delta_2 k}-1)/\delta_2 \\ (e^{j\delta_2 k}-e^{-j\delta_1 k})/(\delta_1+\delta_2) \\ (e^{j\delta_2 k}+e^{-j\delta_1 k}-2)/(\delta_1+\delta_2) \end{bmatrix}. \quad \text{Eq. 47}$$

Figure 8A:
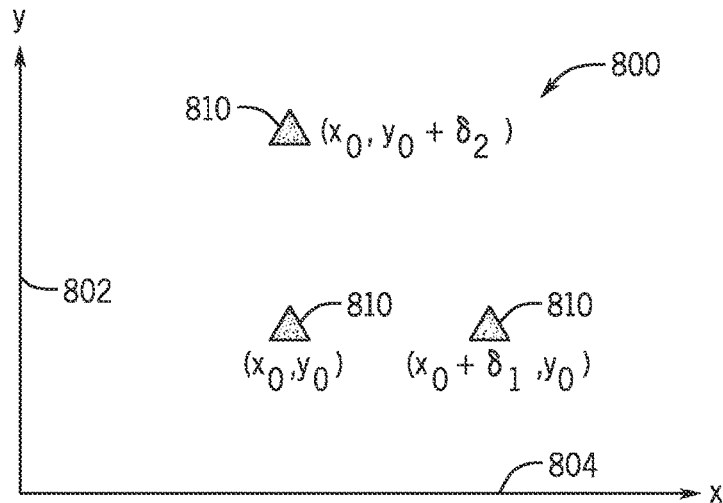
FIG. 8A is an illustration of a two-dimensional (2-D) arrangement of receiver positions per station according to an example implementation.

FD-MIMAP may be used with a multidimensional array of receivers. In this manner, FIG. 8A is an illustration 800 of seismic receivers 810 that are disposed at points defined by two dimensions: a cross-line dimension 808 and an inline dimension 804. The measurement vector at position $(x_0, y_0)$ may be defined as follows:

$$m(x_0, y_0) = \begin{bmatrix} m_1(x_0, y_0) \\ m_2(x_0, y_0) \\ m_3(x_0, y_0) \\ m_4(x_0, y_0) \end{bmatrix} = \quad \text{Eq. 48}$$

$$\begin{bmatrix} s(x_0, y_0) \\ [s(x_0+\delta_1, y_0)-s(x_0, y_0)]/\delta_1 \\ [s(x_0, y_0+\delta_2)-s(x_0, y_0)]/\delta_2 \\ [s(x_0, y_0+\delta_2)-s(x_0+\delta_1, y_0)]/\sqrt{\delta_1^2+\delta_2^2} \end{bmatrix};$$

and the corresponding transfer function vector may then be described as follows:

$$\eta(k_x, k_y, x_0, y_0) = \begin{bmatrix} \eta_1(k_x, k_y) \\ \eta_2(k_x, k_y) \\ \eta_3(k_x, k_y) \\ \eta_4(k_x, k_y) \end{bmatrix} == \quad \text{Eq. 49}$$

$$\begin{bmatrix} 1 \\ (e^{j\delta_1 k_x}-1)/\delta_1 \\ (e^{j\delta_2 k_y}-1)/\delta_2 \\ (e^{j\delta_2 k_y}-e^{j\delta_1 k_x})/\sqrt{\delta_1^2+\delta_2^2} \end{bmatrix}.$$

It is noted that the measurement vector at a given station may be augmented to also include the additional measurements at $s(x_0+\delta_1, y_0)$ and $s(x_0, y_0+\delta_2)$.

Figure 8B:
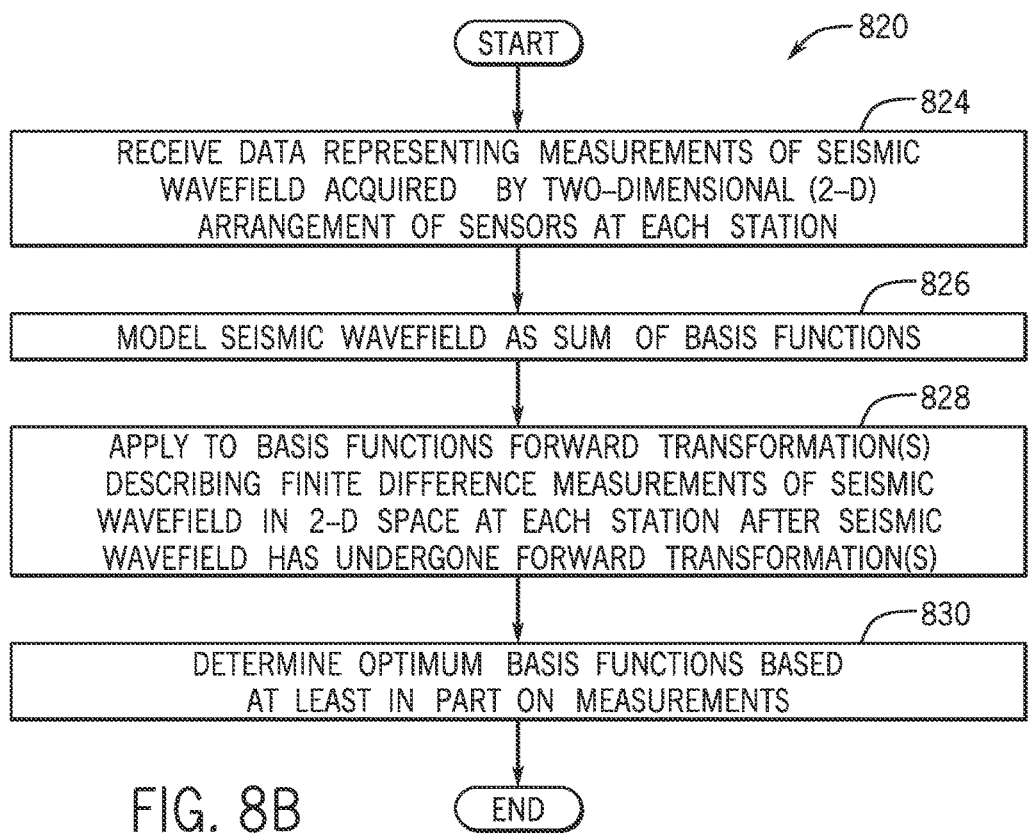
FIG. 8B is a flow diagram depicting a technique to perform EGMP-based FD-MIMAP in multiple spatial dimensions according to an example implementation.

Thus, referring to FIG. 8B, a technique 820 includes receive data (block 824) representing measurements of a seismic wavefield acquired by 2-D arrangement of receivers at each station. The technique 820 includes modeling (block 826) the seismic wavefield as a sum of basis functions and applying (block 828) a forward transformation to the basis functions, wherein the forward transformation describes finite difference measurements of the seismic wavefield in 2-D space at each station after the seismic wavefield has undergone the forward transformation. The technique 820 includes determining optimum basis functions based at least in part on the measurements, pursuant to block 830.

FD-MIMAP may be further generalized, in accordance with further example implementations, to allow for not only various differences of measurements, but arbitrary linear combinations of measurements as well. If a receiver station includes L receivers with individual measurements $\{m(x_l): l=1, 2, \ldots, L\}$, it may be advantageous to define additional channels as $\Sigma_l^L \alpha_l m(x_l)$, where $\alpha_l$ are arbitrary real or complex numbers. Finite differences are a special case of the general construction.

In some implementations, the techniques described herein may be used in a land seismic survey where land-seismic receivers may be arranged in such a way to allow the finite differences gradients to be calculated. In such a configuration, the EGMP-based technique may be used to overcome limitations of the spread, making the overall acquisition much more efficient. Similar configurations may be made on the source side.

Although example implementations have been described above in which stations measure data, the techniques and systems that are described herein may also be applied to the source side, i.e., applied to reconstructing a seismic source wavefield. In this manner, rather than having a number of stations measuring an unknown signal, there are a number of sources emitting signals observed at some arbitrary measurement point. In the case of sources, by source-receiver reciprocity, each of the terms in the description that relate to a measurement point, now relate to a source point. Also, note that while the description deals with point measurements, seismic sources may not necessarily behave as point sources. For example, a given seismic source may have source elements that are distributed over a relatively larger spatial area, but provided the element response of that source was known, this could also be incorporated within the transfer function $\eta(k,x)$.

As a more specific example, the systems and techniques that are disclosed herein may be applied to the case of a marine seismic source array. In such a survey, the farfield spectrum of an N (point-) seismic source array may be described as follows:

$$W(\omega, k_x, k_y) = \sum_{n=1}^{N} S_n(\omega) \exp(jk_x x_n + jk_y x_n) \times [\exp(jk_z z_n) + \rho \exp(-jk_z z_n)] \exp(-jk_z z_{ref}),$$ Eq. 50 where "$S_n(\omega)$" represents the source signature output for the n-th source; "$k_x$," "$k_y$," and "$k_z$" represent the three components of the wavenumber vector; "$x_n$," "$y_n$" and "$z_n$" represent the Cartesian co-ordinates of the n-th source; "$z_{ref}$" represents a reference depth from which the response of the array is computed; "$\omega$" represents the angular frequency; and "$\rho$" represents the sea-surface reflection coefficient. The farfield spectrum describes the effect of the source array on the downgoing seismic wavefield. Therefore, the spectrum described by Eq. 50 is the transfer function between the wavefield emitted by the source array, and some desired source wavefield. For example, the desired source wavefield could be the downgoing wavefield generated by a monopole source at some reference location (e.g., at the reference depth, $z_{ref}$).

Figures 9A, 9B:
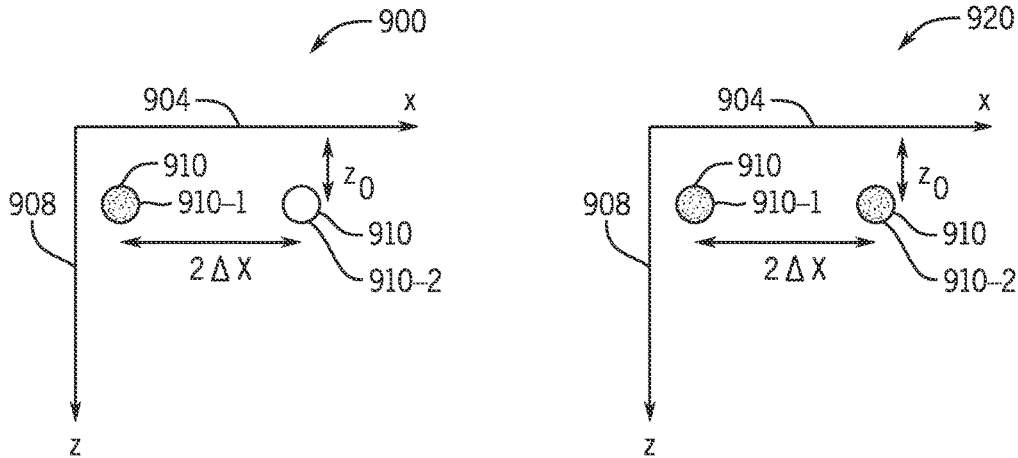
FIG. 9A is a 2-D illustration of source elements of a source array emitting opposite phase wavefields according to an example implementation.
FIG. 9B is a 2-D illustration of the source elements emitting in-phase wavefields according to an example implementation.

By including the source signature of each source element, $S_n(\omega)$, Eq. 50 may describe the combination of an arbitrary number of sources, with arbitrary phase, amplitude behavior, and time delays. As a more specific example, referring to an illustration 900 of FIG. 9A, a source array may include two seismic sources 910 (seismic sources 910-1 and 910-2 being depicted in FIG. 9A). As an example, the seismic sources 910 may be marine vibrators. As a more specific example, the vibrators may output the same wavefield but with opposite polarity. For the example of FIG. 9A, the seismic sources 910-1 and 910-2 are separated by a distance "$2\Delta x$" along the inline axis 904 and have opposite polarities. Moreover, the sources 910-1 and 910-2 are disposed at a depth $z_0$. For the configuration of FIG. 9A, provided the distance between the two sources 910-1 and 910-2 is no greater than half (and in some aspects no less than a third) of the shortest wavelength of interest, it is possible to generate wavefields that approximate a source gradient. If the output wavefield from each source is $S_0(\omega)$, source 910-2 is located at $x=-\Delta x$, $y=0$, $z=z_0$, and source 910-1 is located at $x=\Delta x$, $y=0$, $z=z_0$, then the farfield spectrum of the gradient source array, Wg, may be represented as follows:

$$W^g(\omega,k_x,k_y) = S_0(\omega)[\exp(jk_x(\Delta x)) - \exp(jk_x(-\Delta x))] \times [\exp(jk_z z_0) + \rho \exp(-jk_z z_0)] \exp(jk_z z_{ref})$$ Eq. 51

In some implementations, the same source array may generate a wavefield that approximates a monopole source. This arrangement is depicted in an illustration 920 of FIG. 9B. In this manner, both sources 910-1 and 910-2 emit with the same phase. The farfield spectrum of the monopole source array, Wm, may be described as follows:

$$W^m(\omega,k_x,k_y) = S_0(\omega)[\exp(jk_x(\Delta x)) + \exp(jk_x(-\Delta x))] \times [\exp(jk_z z_0) + \rho \exp(-jk_z z_0)] \exp(-jk_z z_{ref})$$ Eq. 52

Therefore, in such a source array configuration, an EGMP-based technique may be used where the measurement channels correspond to measurements made in response to sources emitting either in-phase or in opposite phase, and the transfer functions correspond to the farfield radiation patterns described in Eqs. 51 and 52. In this specific case, the source is towed in the y-direction, alternating between emitting a wavefield in-phase and in opposite phase, and these measurements can be used to reconstruct the wavefield in the x-direction.

Figure 9C:
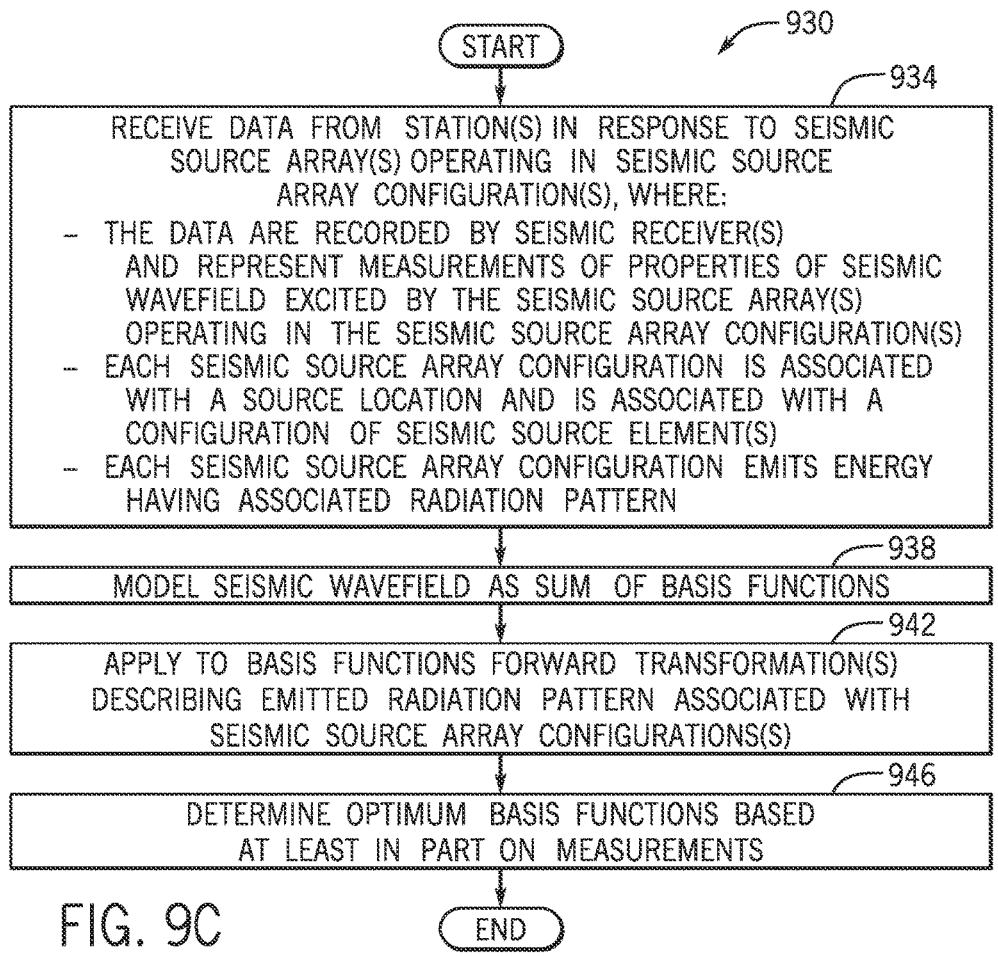
FIG. 9C is a flow diagram depicting an EGMP-based technique applied on the source side to reconstruct a seismic wavefield according to an example implementation.

To summarize, in accordance with example implementations, FIG. 9C depicts a technique 930 to reconstruct a seismic wavefield that would be received in response to one or more seismic source configurations with given radiation patterns from one or more locations. Referring to FIG. 9C, the technique 930 includes receiving data from one or more stations in response to one or more seismic source arrays operating in one or more seismic source array configurations. The data are recorded by one or more seismic receivers and represent measurements of properties of a seismic wavefield that is excited by the seismic source array(s) operating in the seismic source array configuration(s). Each seismic source array configuration is associated with a source location and is associated with a configuration of one or more seismic source elements, and each seismic source array configuration emits energy having an associated radiation pattern. Pursuant to the technique 930, the seismic wavefield is modeled (block 938) as sum of basis functions; forward transformation(s) are applied to the basis functions describing emitted radiation pattern(s) that are associated with the seismic source configuration(s), pursuant to block 942; and optimum basis functions are determined based at least in part on the measurements, pursuant to block 946.

A similar approach may also be adopted for land seismic sources. In this case, the ghost (depth dependent) terms are not be present, and other factors such as source coupling may need to be considered.

Figure 10:
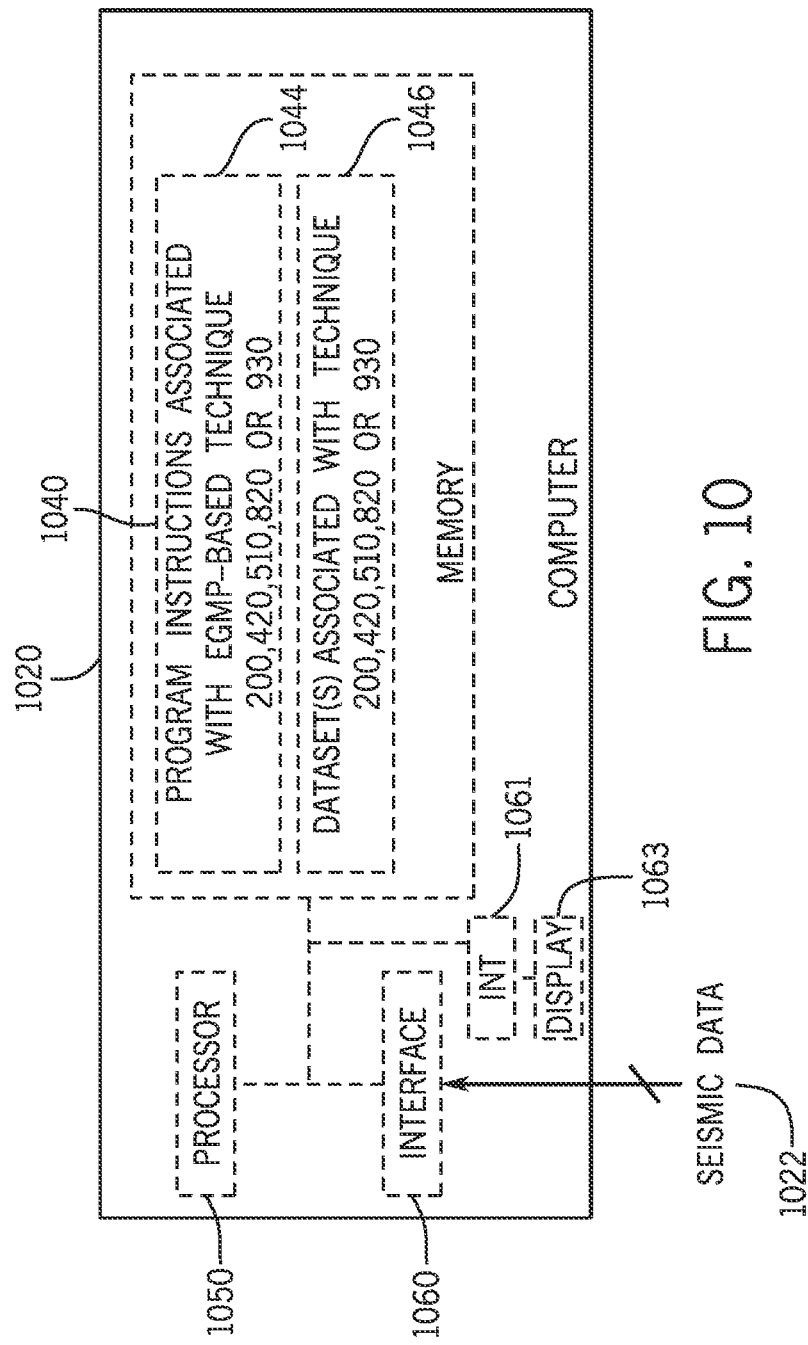
FIG. 10 is a schematic diagram of a computer according to an example implementation.

Referring to FIG. 10, in accordance with some implementations, a machine, such as a computer 1020, may contain a processor 1050 for purposes of processing data to perform receiver side and/or source side wavefield reconstruction, as disclosed herein. Moreover, the computer 1020 may use the processor 1050 to perform, in general, signal reconstruction for signals (ultrasound signals, for example) outside of the seismic industry.

In accordance with some implementations, the processor 1050 may be formed from one or more microprocessors and/or microprocessor processing cores and thus, may be itself be formed from multiple processors. In accordance with example implementations, the processor 1050 may be formed from, depending on the particular implementation, one or multiple Central Processing Units (CPUs), or application specific integrated circuits (ASICs), field programmable gate arrays (FPGAs), programmable logic devices (PLDs), or other appropriate devices, as can be appreciated by one of ordinary skill in the art. As a non-limiting example, the computer 1020 may be disposed in one of many different locations, such as on a survey vessel of a seismic acquisition system or in an ultrasound processing and imaging system. Moreover, the computer 1020 may be disposed at a site that is remote with respect to the region in which the signal to be reconstructed is sampled. Moreover, the computer 1020 may be a distributed processing system, in accordance with further implementations, with, for example, processing components geographically disposed at different locations.

As depicted in FIG. 10, the processor 1050 may be coupled to a communication interface 1060 for purposes of receiving data 1022, such as seismic data (particle motion data and pressure data acquired by seismic receivers, such as towed seismic receivers used in a towed marine seismic acquisition system, for example), data representing an ultrasound image, and so forth. As examples, the communication interface 1060 may be a Universal Serial Bus (USB) interface, a network interface, a removable media interface (a flash card, CD-ROM interface, etc.) or a magnetic storage interface (an Intelligent Device Electronics (IDE)-compliant interface or Small Computer System Interface (SCSI)-compliant interface, as non-limiting examples). Thus, the communication interface 1060 may take on numerous forms, depending on the particular implementation.

In accordance with example implementations, the processor 1050 may be coupled to a memory 1040 that stores machine executable instructions, called "program instructions 1044" (also called "software"), which when executed by the processor 1050, may cause the processor 1050 to perform various tasks of one or more of the techniques that are described herein, such, for example, EGMP-based technique 200, 420, 510, 820 or 930, as well as one or more parts of an EGMP-based technique that reconstructs signals outside of the seismic industry or does not use a generalized matching pursuit technique to determine the optimum basis functions, as further described below. In accordance with example implementations, the processor 1050 may execute the program instructions 1044 for purposes of performing one or more of the following operations that are described herein: modeling a wavefield as a set of basis functions; applying forward transformation(s) to basis functions; and determining optimum basis functions.

Thus, the processor 1050, through the execution of the program instructions 1044, determines parameters for a reconstructed signal, such as a reconstructed seismic wavefield. As can be appreciated by one of ordinary skill in the art, a reconstructed wavefield may be used in various applications, such for purposes as imaging and or for purpose of inverting for properties of a surveyed structure of interest (tissue or geologic structure, for example). Moreover, the processor 1050, in accordance with example implementations, may execute the program instructions 1044 for purposes of performing one or more of these applications using a reconstructed wavefield. Thus, may variations are contemplated, which are within the scope of the appended claims.

In general, the memory 1040 represents non-transitory storage and may take on numerous forms, such as (as non-limiting examples) semiconductor storage, magnetic storage, optical storage, phase change memory storage, capacitor-based storage, and so forth, depending on the particular implementation. The memory 1040 may be formed from memory devices corresponding to these storage technologies, as well as memory devices corresponding to a combination of these memory technologies, or other memory technologies, depending on the particular implementation. When executing one or more of the program instruction 1044, the processor 1050 may store preliminary, intermediate and/or final datasets 1046 obtained via the execution of the instructions 1044 in the memory 1040.

It is noted that the computer 1020 is merely an example of one out of many possible architectures, in accordance with the techniques and systems that are disclosed herein. Moreover, the computer 1020 is represented in a simplified form in FIG. 10, as the computer 1020 may have various other components (a display to display initial, intermediate and/or final results of the computer's processing; input devices to control the processing by the computer; and so forth), as can be appreciated by one of ordinary skill in the art.

Other implementations are contemplated, which are within the scope of the appended claims. For example, in accordance with further example implementations, a technique other than a matching pursuit-based technique may be applied for purposes of determining the optimum basis functions. For example, in accordance with further example implementations, determining the optimum basis functions may be performed by solving a sparsity-promoting optimization problem, such as an L–1 norm or similar problem. In this manner, in accordance with example implementations, the computer 1020 may execute program instructions that cause the computer 1020 to process data to solve the sparsity-promoting optimization problem.

The systems and techniques that are described herein may also be applied on the source side to reconstruct a signal other than a seismic wavefield, in accordance with further example implementations.

Although systems and techniques are disclosed herein to reconstruct seismic wavefields, the systems and techniques may be used, in general, to reconstruct signals (ultrasound imaging signals, for example) other than seismic wavefields. Thus, in general, a technique to reconstruct a signal includes receiving data over one or more channels from a plurality of stations. The data are recorded by a plurality of receivers and represent measurements of at least one property of a signal to be reconstructed. Each station includes a region in space that includes one or more of the receivers. Each channel either measures a property of the signal or measures a property of the signal after the signal has undergone forward transformation(s); and at least one channel is derived as a function of one or more of the other channels. The technique includes modeling the signal as a sum of basis functions; applying forward transformation(s) to the basis functions; and determining optimum basis functions based at least in part on the measurements. In this manner, basis functions that best fit or best describe the measurements may be determined for purposes of optimizing the basis functions, in accordance with example implementations.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for reconstructing a seismic wavefield, comprising:
   receiving data over one or more channels of a plurality of channels from a plurality of stations, wherein:
      the data are recorded by a plurality of seismic receivers and represent measurements of properties of the seismic wavefield;
      each station of the plurality of stations comprises a region in space including one or more seismic receivers of the plurality of seismic receivers;
      each channel of the plurality of channels either measures a property of the seismic wavefield or a property of the seismic wavefield after the seismic wavefield has undergone a known transformation; and
      at least one channel of the plurality of channels is derived as a function of one or more other channels of the plurality of channels; and
   using a processor based machine to process the data to:
      model the seismic wavefield as a sum of basis functions;
      apply to the basis functions forward transformations describing the measurements received over the one or more channels of the plurality of channels; and
      determine optimum basis functions based at least in part on the measurements.

2. The method of claim 1 wherein at least one channel of the plurality of channels is derived as a function of at least two other channels of the plurality of channels.

3. The method of claim 1, wherein the task of processing data in the processor-based machine to determine the optimum basis functions comprises:
   iteratively matching the transformed basis functions to the measurements received over the one or more channels; and
   using the best matched transformed basis functions to reconstruct the seismic wavefield at one or more locations.

4. The method of claim 1, wherein the task of processing data in processor-based machine to determine the optimum basis functions comprises:
   solving a sparsity-promoting optimization problem; and
   using the transformed optimum basis functions to reconstruct the seismic wavefield at one or more locations.

5. The method of claim 1, wherein an average station interval associated with the stations in at least one spatial dimension is greater than half of the shortest wavelength of interest in the wavefield.

6. The method in claim 1, wherein the function comprises a finite-difference operation.

7. The method of claim 6, wherein the function comprises a finite-difference operation having an order of at least two.

8. The method of claim 7, wherein the finite-difference operation comprises a multi-dimensional finite-difference operation.

9. The method of claim 1, wherein the function comprises a finite difference operation, a given station has an associated average receiver interval within the given station over which finite-differences are computed according to the finite different operation is shorter than half of the shortest wavelength of interest in the wavefield.

10. A method for reconstructing a seismic wavefield, comprising:
    receiving data from one or more stations in response to one or more seismic source arrays operating in one or more seismic source array configurations, wherein:
       the data are recorded by one or more seismic receivers and represent measurements of properties of a seismic wavefield excited by the one or more seismic source arrays operating in the one or more seismic source array configurations;
       each configuration of the plurality of seismic source array configurations is associated with a source location and is associated with a configuration of one or more seismic source elements; and
       each seismic source array configuration of the plurality of seismic source array configurations emits energy having an associated radiation pattern; and
    using a processor based machine to process the data to:
       model the seismic wavefield as a sum of basis functions;
       apply to the basis functions forward transformations describing the emitted radiation pattern associated with at least one source array configuration of the plurality of seismic source array configurations; and
       determine optimum basis functions based at least in part on the measurements.

11. The method of claim 10, wherein the reconstructed seismic wavefield comprises the wavefield that would be received in response to one or more seismic source configurations with given radiation patterns from one or more locations.

12. The method of claim 11, wherein at least one of the given radiation patterns comprises a monopolar radiation pattern.

13. The method of claim 10, wherein at least one seismic source array configuration of the plurality of seismic source array configurations is derived as a function of one or more other seismic source array configurations.

14. The method of claim 10, wherein the task of processing data in processor-based machine to determine the optimum basis functions comprises:
 iteratively matching the transformed basis functions to the measurements represented by the data in response to the one or more seismic source array configurations; and
 using the matching to reconstruct the seismic wavefield emitted from the one or more source locations.

15. The method of claim 10, wherein the task of processing data in processor-based machine to determine the optimum basis functions comprises:
 solving a sparsity-promoting optimization problem; and
 using the transformed optimum basis functions to reconstruct the seismic wavefield emitted from the one or more source locations.

16. The method of claim 10, wherein an average source location interval associated with the source location in at least one spatial dimension is greater than half of the shortest wavelength of interest in the wavefield.

17. The method in claim 10, wherein the source array configuration comprises a source array comprising a subset of elements activated substantially in anti-phase.

18. The method in claim 10, wherein the source array configuration comprises a source array comprising elements activated in phase.

19. The method in claim 10, wherein the source array configuration at one or more locations comprises a source array comprising a subset of elements activated in anti-phase; and another source array configuration at one or more locations comprises a source array comprising elements activated in phase.

20. The method of claim 10, wherein the source element comprises an airgun or a marine vibrator.

21. A method comprising:
 receiving data over one or more channels of a plurality of channels from a plurality of stations, wherein:
  the data are recorded by a plurality of receivers and represent measurements of properties of a signal to be reconstructed;
  each station of the plurality of stations comprises a region in space including one or more seismic receivers of the plurality of receivers;
  each channel of the plurality of channels either measures a property of a signal to be reconstructed or a property of the signal after the signal has undergone a known transformation; and
  at least one channel of the plurality of channels is derived as a function of one or more other channels of the plurality of channels; and
 using a processor based machine to process the data to:
  model the signal as a sum of basis functions;
  apply to the basis functions at least one forward transformation describing the measurements received over the one or more channels of the plurality of channels; and
  determine optimum basis functions based at least in part on the measurements.

22. A system comprising:
 an interface to receive data over one or more channels of a plurality of channels from a plurality of stations, wherein:
  the data are recorded by a plurality of seismic receivers and represent measurements of properties of the seismic wavefield;
  each station of the plurality of stations comprises a region in space including one or more seismic receivers of the plurality of seismic receivers;
  each channel of the plurality of channels either measures a property of the seismic wavefield or a property of the seismic wavefield after the seismic wavefield has undergone a known transformation; and
  at least one channel of the plurality of channels is derived as a function of one or more other channels of the plurality of channels; and
 the processor processes the data to:
  model the seismic wavefield as a sum of basis functions;
  apply to the basis functions forward transformations describing the measurements received over the one or more channels of the plurality of channels; and
  determine optimum basis functions based at least in part on the measurements.

23. A system comprising:
 an interface to receive data from one or more stations in response to one or more seismic source arrays operating in one or more seismic source array configurations, wherein:
  the data are recorded by one or more seismic receivers and represent measurements of properties of a seismic wavefield excited by the one or more seismic source arrays operating in the one or more seismic source array configurations;
  each configuration of the plurality of seismic source array configurations is associated with a source location and is associated with a configuration of one or more seismic source elements; and
  each seismic source array configuration of the plurality of seismic source array configurations emits energy having an associated radiation pattern; and
 a processor to:
  model a seismic wavefield to be reconstructed as a sum of basis functions;
  apply to the basis functions at least one forward transformation describing the emitted radiation pattern associated with at least one source array configuration of the plurality of seismic source array configurations; and
  determine optimum basis functions based at least in part on the measurements.

* * * * *